(12) United States Patent
Watanabe

(10) Patent No.: US 11,437,877 B2
(45) Date of Patent: Sep. 6, 2022

(54) ROTOR, MOTOR, COMPRESSOR, AND AIR CONDITIONER

(71) Applicant: Mitsubishi Electric Corporation, Tokyo (JP)

(72) Inventor: Takanori Watanabe, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/496,592

(22) PCT Filed: May 1, 2017

(86) PCT No.: PCT/JP2017/017134
§ 371 (c)(1),
(2) Date: Sep. 23, 2019

(87) PCT Pub. No.: WO2018/203364
PCT Pub. Date: Nov. 8, 2018

(65) Prior Publication Data
US 2020/0321816 A1    Oct. 8, 2020

(51) Int. Cl.
*H02K 1/276* (2022.01)
*F25B 13/00* (2006.01)
(Continued)

(52) U.S. Cl.
CPC ............. *H02K 1/276* (2013.01); *F25B 13/00* (2013.01); *F25B 31/026* (2013.01); *H02K 21/16* (2013.01)

(58) Field of Classification Search
CPC ........ H02K 1/276; H02K 1/2766; H02K 1/27; H02K 1/2706; H02K 1/22; H02K 1/28;
(Continued)

(56) References Cited

U.S. PATENT DOCUMENTS

2012/0119604 A1    5/2012    Nakayama et al.
2014/0000096 A1    1/2014    Takemoto et al.
(Continued)

FOREIGN PATENT DOCUMENTS

CN    103516148 A    1/2014
JP    2001-157396 A    6/2001
(Continued)

OTHER PUBLICATIONS

Chinese Office Action dated Jan. 6, 2021, issued in corresponding CN Patent Application No. 201780089672.6 (and English Machine Translation).
(Continued)

*Primary Examiner* — Bryan R Perez
(74) *Attorney, Agent, or Firm* — Posz Law Group, PLC

(57) ABSTRACT

A rotor includes a rotor core formed of a stacked body in which two or more first electromagnetic steel sheets and a second electromagnetic steel sheet are stacked in a direction of an axis, the rotor core having a magnet insertion hole passing through the stacked body in the direction of the axis, and a first permanent magnet and a second permanent magnet disposed in the magnet insertion hole. The magnet insertion hole has a first region in which the first permanent magnet is inserted, and a second region in which the second permanent magnet is inserted. Each of the two or more first electromagnetic steel sheets has a bridge dividing the magnet insertion hole into the first region and the second region. The second electromagnetic steel sheet has the magnet insertion hole in which the first region and the second region are formed continuously with each other.

19 Claims, 18 Drawing Sheets

(51) Int. Cl.
*F25B 31/02* (2006.01)
*H02K 21/16* (2006.01)

(58) Field of Classification Search
CPC ........ H02K 1/02; H02K 1/274; H02K 1/2746; H02K 1/148; H02K 1/2786; H02K 1/2773
See application file for complete search history.

(56) References Cited

U.S. PATENT DOCUMENTS

| | | | | |
|---|---|---|---|---|
| 2015/0244238 A1* | 8/2015 | Tanaka | .................... | H02K 7/04 417/410.3 |
| 2016/0065015 A1* | 3/2016 | Kameda | ................ | H02K 1/276 310/156.38 |
| 2017/0338707 A1 | 11/2017 | Shono et al. | | |

FOREIGN PATENT DOCUMENTS

| | | |
|---|---|---|
| JP | 2002-136008 A | 5/2002 |
| JP | 2009-153365 A | 7/2009 |
| JP | 2011-004480 A | 1/2011 |
| JP | 2013-046466 A | 3/2013 |
| JP | 2014-007925 A | 1/2014 |
| JP | 2014-39354 A | 2/2014 |
| JP | 2017216846 A * | 12/2017 |
| WO | 2016-104418 A1 | 6/2016 |

OTHER PUBLICATIONS

Chinese Office Action dated Aug. 11, 2021, issued in corresponding CN Patent Application No. 201780089672.6 (and English Machine Translation).

Office Action dated Apr. 28, 2020 issued in corresponding JP patent application No. 2019-516305 (and English translation).

International Search Report of the International Searching Authority dated Aug. 8, 2017 for the corresponding international application No. PCT/JP2017/017134 (and English translation).

Office Action dated Dec. 1, 2020 issued in corresponding JP patent application No. 2019-516305 (and English translation).

Office Action (Decision of Refusal) dated Jul. 4, 2022 in connection with counterpart Chinese Patent Application No. 201780089672.6 (and English machine translation).

Chinese Office Action dated Mar. 2, 2022, issued in corresponding CN Patent Application No. 201780089672.6 (and English Machine Translation).

* cited by examiner

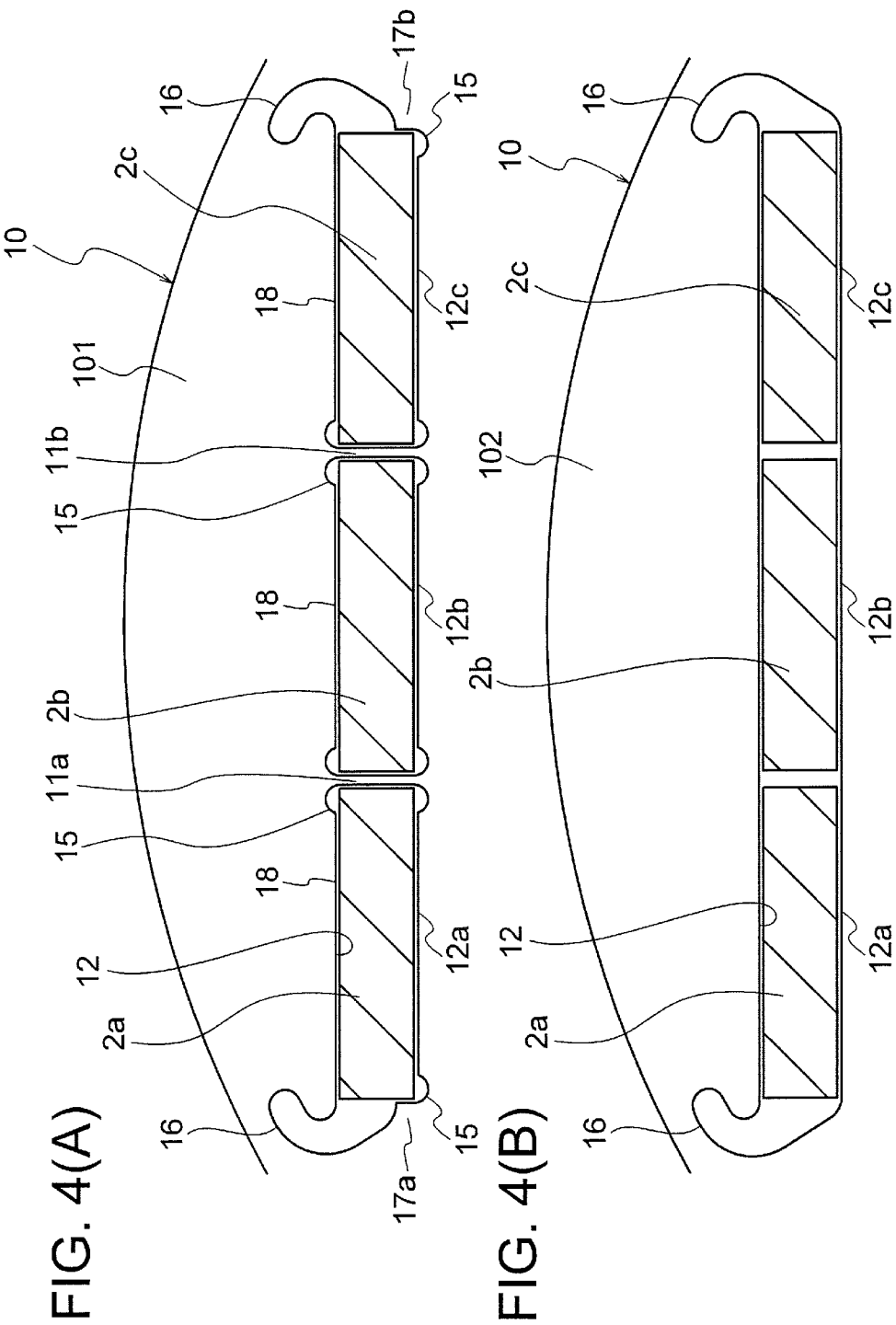

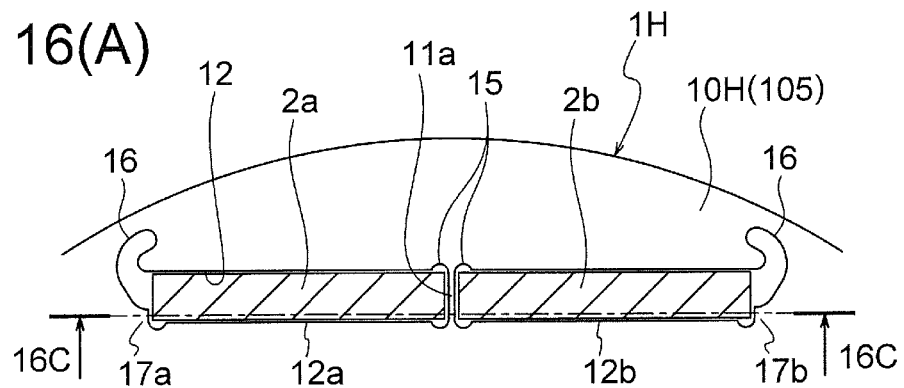
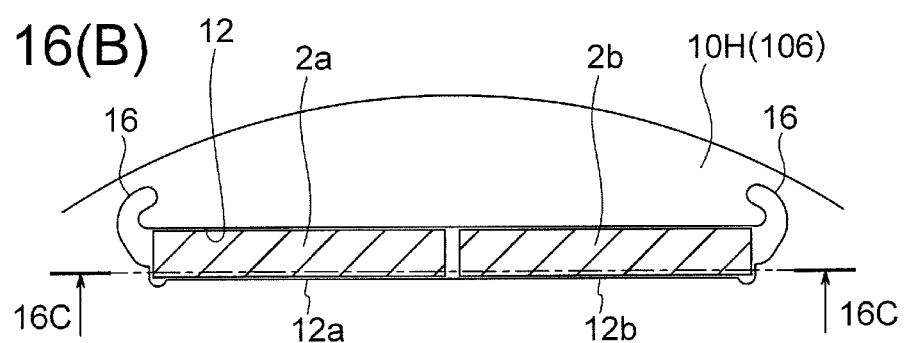
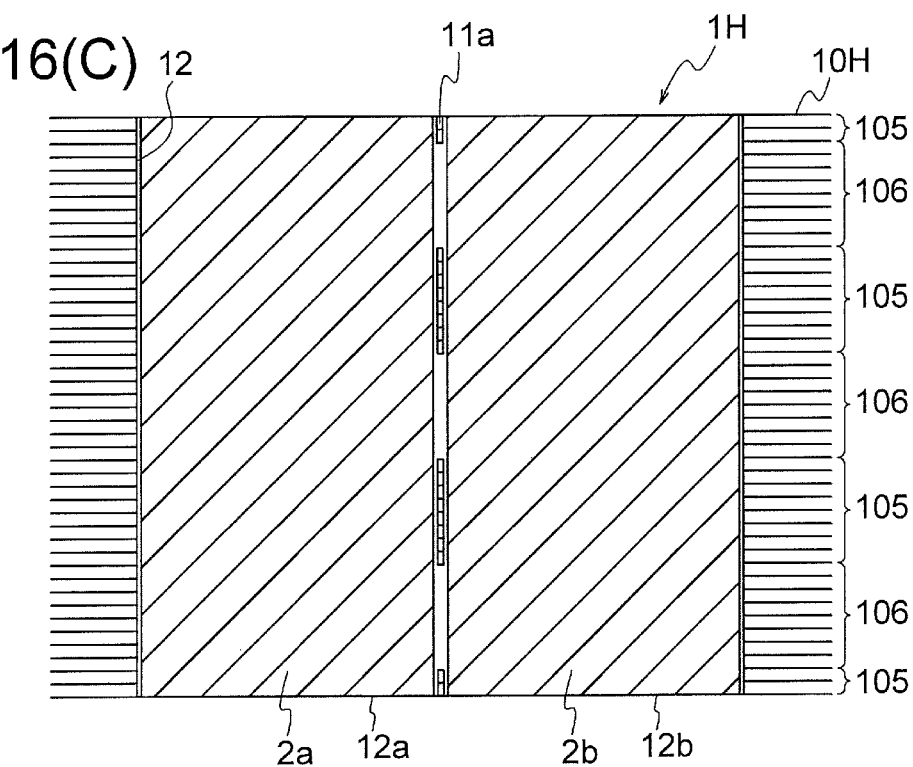

ROTOR, MOTOR, COMPRESSOR, AND AIR CONDITIONER

CROSS REFERENCE TO RELATED APPLICATION

This application is a U.S. national stage application of International Patent Application No. PCT/JP2017/017134 filed on May 1, 2017, the disclosure of which is incorporated herein by reference.

TECHNICAL FIELD

The present invention relates to a permanent magnet-embedded rotor, and relates to a motor, a compressor and an air conditioner including the rotor.

BACKGROUND

In a permanent magnet-embedded rotor, a permanent magnet is disposed inside a magnet insertion hole formed in a rotor core. In some rotors, the magnet insertion hole is divided by a bridge into two or more in a circumferential direction in order to enhance strength of the rotor core.

On the other hand, in the case where the bridge is provided in the magnet insertion hole, magnetic flux caused by magnetic field (diamagnetic field) from a stator flows into the bridge, and an end part of the permanent magnet facing the bridge is likely to be demagnetized.

Patent Reference 1 discloses a rotor in which electromagnetic steel sheets each having magnet insertion holes provided with bridges and magnet insertion holes provided with no bridges are stacked while rotating each electromagnetic steel sheet by 90 degrees.

Patent Reference 2 discloses a rotor in which first electromagnetic steel sheets each having magnet insertion holes provided with positioning projections instead of bridges and second electromagnetic steel sheets each having magnet insertion holes provided with bridges are alternately stacked.

Patent Reference 3 discloses a rotor in which a magnet insertion hole is provided with a bridge and a relief part for reducing stress concentration is formed in a part of a rotor core corresponding to a root of the bridge.

PATENT REFERENCE

Patent Reference 1: Japanese Patent Application Publication No. 2009-153365 (see FIG. 3)

Patent Reference 2: Japanese Patent Application Publication No. 2001-157396 (see FIGS. 1, 10, and 11)

Patent Reference 3: Japanese Patent Application Publication No. 2002-136008 (see FIG. 2)

However, in the rotors disclosed in Patent References 1 and 2, the bridge is constituted by one electromagnetic steel sheet, and thus it is difficult to obtain sufficient strength of the rotor core. In the rotor disclosed in Patent Reference 3, demagnetization of a permanent magnet may be caused by magnetic flux flowing from the stator to the bridge.

SUMMARY

The present invention is made to solve the problems described above, and an object of the present invention is to enhance strength of a rotor core and suppress demagnetization of a permanent magnet.

A rotor according to the present invention includes a rotor core formed of a stacked body in which two or more first electromagnetic steel sheets and a second electromagnetic steel sheet are stacked in a direction of an axis, the rotor core having a magnet insertion hole passing through the stacked body in the direction of the axis, and a first permanent magnet and a second permanent magnet disposed in the magnet insertion hole. The magnet insertion hole has a first region in which the first permanent magnet is inserted, and a second region in which the second permanent magnet is inserted, the first region and the second region being arranged in a circumferential direction about the axis. The two or more first electromagnetic steel sheets are disposed on at least one end of the rotor core in the direction of the axis. Each of the two or more first electromagnetic steel sheets has a bridge dividing the magnet insertion hole into the first region and the second region. The second electromagnetic steel sheet has the magnet insertion hole in which the first region and the second region are formed continuously with each other.

According to the present invention, strength of the rotor core can be enhanced since each of the first electromagnetic steel sheets constituting the rotor core has the bridge, and demagnetization of the permanent magnets can be suppressed since the second electromagnetic steel sheet includes no bridge. In addition, when the permanent magnets are inserted into the magnet insertion hole, the bridge of each first electromagnetic steel sheet serves as a guide, and thus insertion of the permanent magnets is facilitated. Furthermore, since the bridge is constituted by the two or more first electromagnetic steel sheets, deformation or the like of the bridge during the insertion of the permanent magnets can be suppressed.

BRIEF DESCRIPTION OF THE DRAWINGS

FIG. 4(A) is a sectional view of the rotor of the first embodiment, and FIG. 4(B) is a sectional view at a sheet surface of a second electromagnetic steel sheet.

FIGS. 16(A) and 16(B) are sectional views of a rotor according to a ninth embodiment, and FIG. 16(C) is a sectional view taken along line 16C-16C.

DETAILED DESCRIPTION

First Embodiment (Configuration of Motor)

Figure 1:
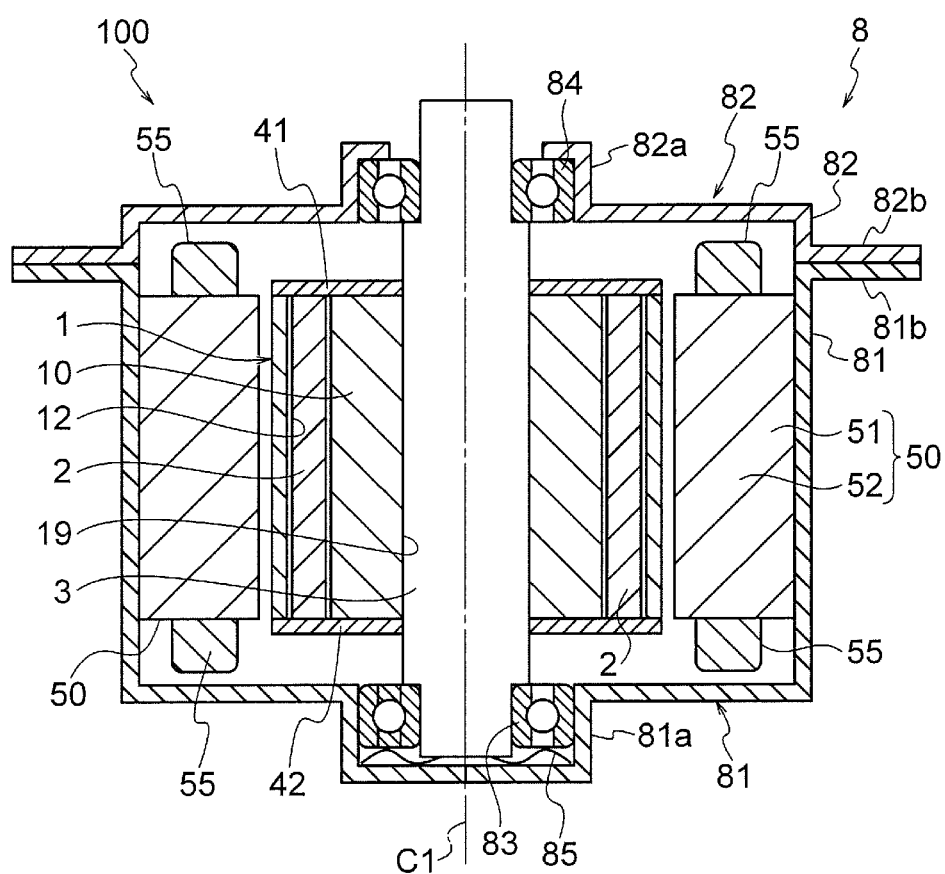
FIG. 1 is a longitudinal sectional view of a motor according to a first embodiment.

First, a motor according to a first embodiment of the present invention will be described. FIG. 1 is a longitudinal sectional view illustrating a configuration of a motor 100 according to the first embodiment. The motor 100 of the first embodiment is a brushless DC motor. The motor 100 is a permanent magnet-embedded motor in which permanent magnets are embedded in a rotor. The motor 100 includes a rotor 1 including a shaft 3 as a rotation shaft, an annular stator 5 disposed around the rotor 1, and a housing 8 in which the stator 5 is housed.

In the following description, a direction of an axis C1 that is a rotation axis of the rotor 1 (i.e., a center axis of the shaft 3) will be referred to as an "axial direction". A circumferential direction about the axis C1 (i.e., a direction along an outer periphery of the rotor 1 or the stator 5) will be referred to as a "circumferential direction" and indicated by an arrow R1 in FIGS. 2 and 3. A radial direction about the axis C1 (i.e., a direction of a radius of the rotor 1 or the stator 5) will be referred to as a "radial direction".

The housing 8 is divided into a frame 81 and a bracket 82 in the direction of the rotation axis of the rotor 1. The frame 81 has a cylindrical shape, and the stator 5 is inserted into the frame 81. The frame 81 has a flange part 81b at an end on the bracket 82 side, and has a bearing retention part 81a at the other end. A bearing 83 is mounted in the bearing retention part 81a.

The bracket 82 has a cylindrical shape, has a flange part 82b at an end on the frame 81 side, and has a bearing retention part 82a at the other end. A bearing 84 is mounted in the bearing retention part 82a. The bearings 83 and 84 rotatably support the shaft 3 of the rotor 1. The flange parts 81b and 82b of the frame 81 and the bracket 82 are fixed to each other by bonding, screwing with a screw, or welding.

A spring 85 for applying pressure to the bearing 83 in the axial direction is disposed between the bearing retention part 81a of the frame 81 and the bearing 83. The spring 85 is constituted by a wave washer or the like.

Figure 2:
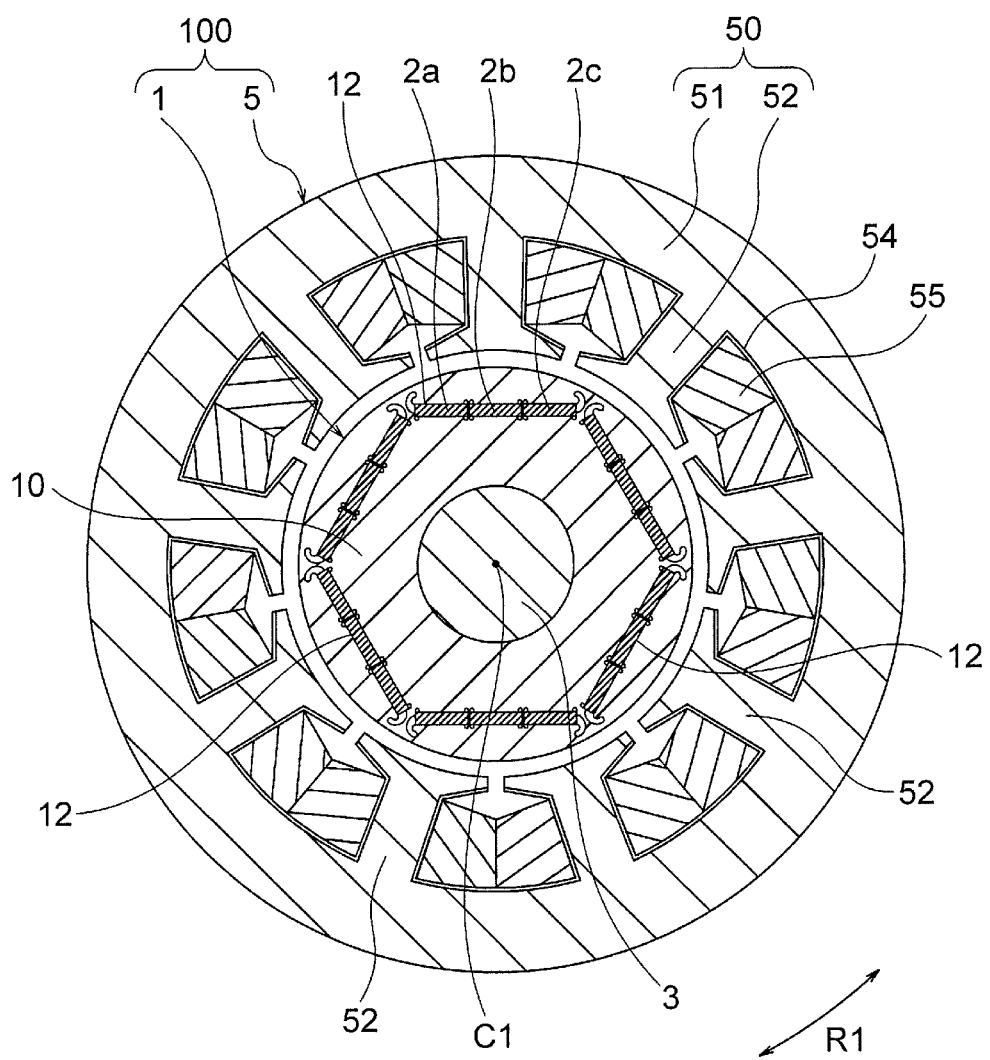
FIG. 2 is a sectional view of the motor according to the first embodiment.

FIG. 2 is a sectional view illustrating a configuration of the motor 100, and corresponds to a cross section perpendicular to the rotation axis (axis C1) of the rotor 1. The housing 8 is omitted in FIG. 2. The motor 100 includes the annular stator 5 and the rotor 1 disposed inside the stator 5, and an air gap is provided between the rotor 1 and the stator 5.

The stator 5 includes a stator core 50 and a coil 55 wound around the stator core 50. The stator core 50 is formed by stacking a plurality of electromagnetic steel sheets each having a thickness of 0.1 mm to 0.7 mm (0.35 mm in this example) in the axial direction and fastening the plurality of electromagnetic steel sheets by crimping or the like.

The stator core 50 includes a yoke part 51 having an annular shape about the axis C1, and a plurality of teeth 52 projecting inward in the radial direction from the yoke part 51. The number of the teeth 52 is nine in this embodiment, but is not limited to nine. A slot in which the coil 55 is disposed is formed between the teeth 52 adjacent to each other in the circumferential direction. Each of the teeth 52 has a tooth end having a wide width (a dimension in the circumferential direction of the stator core 50) at an inner end in the radial direction.

The coil 55 as a stator winding is wound around each of the teeth 52. The coil 55 is formed by winding a magnet wire around each of the teeth 52 via an insulator 54. The coil 55 is obtained by connecting coil parts of three phases (U-phase, V-phase, and W-phase) by a Y connection. The stator 5 is fixed to an inner periphery of the frame 81 illustrated in FIG. 1 by, for example, shrink fitting.

(Configuration of Rotor)

Figure 3:
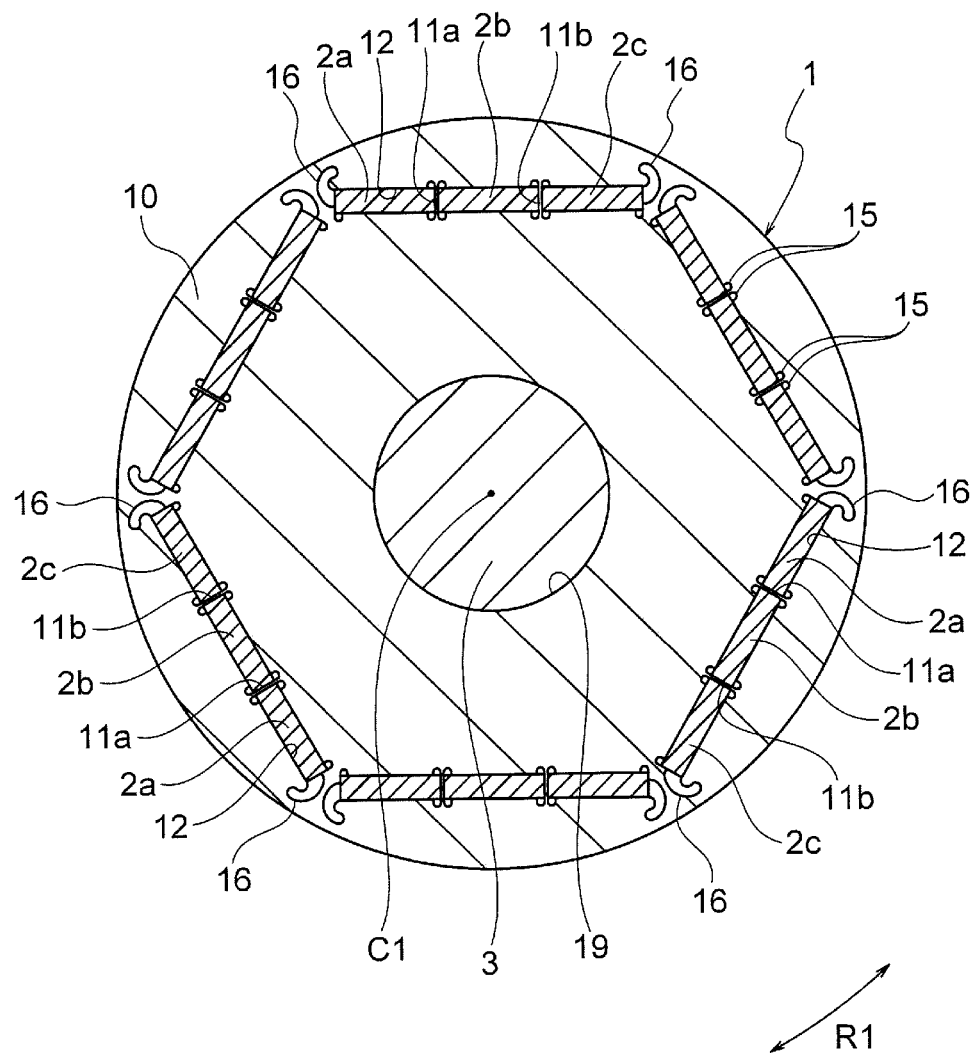
FIG. 3 is a sectional view of a rotor of the motor according to the first embodiment.

FIG. 3 is a sectional view illustrating a configuration of the rotor 1 of the motor 100 of the first embodiment, i.e., a sectional view at a plane perpendicular to the axis C1. As illustrated in FIG. 3, the rotor 1 includes the shaft 3, a rotor core 10 attached to the shaft 3, and permanent magnets 2a, 2b, and 2c embedded in the rotor core 10.

The rotor core 10 is obtained by stacking a plurality of electromagnetic steel sheets each having a thickness of 0.1 mm to 0.7 mm (0.35 mm in this example) in the direction of the rotation axis and fastening the plurality of electromagnetic steel sheets by crimping or the like. As will be described later, the rotor core 10 is constituted by a stacked body obtained by stacking two types of electromagnetic steel sheets, that is, electromagnetic steel sheets 101 (FIG. 4(A)) and electromagnetic steel sheets 102 (FIG. 4(B)).

The rotor core 10 has a cylindrical shape. A shaft hole 19 (center hole) is formed at a center of the rotor core 10 in the radial direction. The shaft 3 serving as a rotation shaft is fixed to the shaft hole 19 by shrink fitting, press fitting or the like.

A plurality of magnet insertion holes 12 are formed along an outer periphery of the rotor core 10. The number of the magnet insertion holes 12 is six in this embodiment. Since one magnet insertion hole 12 corresponds to one magnetic pole, the rotor 1 has six poles. The number of the magnet insertion holes 12 is not limited to six. A part between every adjacent two of the magnet insertion holes 12 serves as an inter-pole. A center of each magnet insertion hole 12 in the circumferential direction serves as a pole center.

The magnet insertion holes 12 pass through the rotor core 10 in the axial direction (see FIG. 1). The magnet insertion holes 12 extend linearly along the outer periphery of the rotor core 10. More specifically, the magnet insertion holes 12 extend linearly in a direction perpendicular to a line extending in a radial direction and passing through the pole center. That is, each of the magnet insertion holes 12 has a length in the axial direction, a width in the circumferential direction, and a thickness in the radial direction.

In each of the magnet insertion holes 12, a permanent magnet 2a (first permanent magnet), a permanent magnet 2b (second permanent magnet), and a permanent magnet 2c (third permanent magnet) are arranged in the circumferential direction. In this embodiment, the permanent magnet 2b is disposed at a center in the circumferential direction, and the permanent magnets 2a and 2c are disposed on both sides of the permanent magnet 2b.

Each of the permanent magnets 2a, 2b, and 2c is a flat-plate member elongated in the axial direction of the rotor core 10, and has a width in the circumferential direction of the rotor core 10 and a thickness in the radial direction of the rotor core 10. The permanent magnets 2a, 2b, and 2c are constituted by, for example, rare earth magnets containing neodymium (Nd), iron (Fe), and boron (B).

Each of the permanent magnets 2a, 2b, and 2c is magnetized in the thickness direction. The permanent magnets 2a, 2b, and 2c disposed in one magnet insertion hole 12 are magnetized such that the same magnetic poles face the same direction in the radial direction.

A flux barrier 16 is formed at each end of the magnet insertion hole 12 in the circumferential direction. The flux barriers 16 are openings formed continuously with the magnet insertion holes 12, and extend outward in the radial direction from the magnet insertion holes 12. The flux barriers 16 reduce magnetic flux leakage between adjacent magnetic poles (i.e., magnetic flux flowing through the inter-pole part). A distance between the outer periphery of the rotor core 10 and the flux barrier 16 is set to be equal to, for example, the thickness of the electromagnetic steel sheet constituting the rotor core 10.

As illustrated in FIG. 1, end plates 41 and 42 are attached to both ends of the rotor core 10 in the axial direction in order to prevent the permanent magnets 2a, 2b, and 2c (also referred to as permanent magnets 2) from detaching from the magnet insertion holes 12. The end plates 41 and 42 are fixed to the rotor core 10 by, for example, welding, bonding, fastening with a bolt and a nut, or press fitting with a spigot joint part.

Next, a configuration of the rotor core 10 will be described. As described above, the rotor core 10 is constituted by a stacked body obtained by stacking the electromagnetic steel sheets 101 (first electromagnetic steel sheets) and the electromagnetic steel sheets 102 (second electromagnetic steel sheets). FIG. 4(A) is a sectional view of the rotor core 10 at a sheet surface of the electromagnetic steel sheet 101. FIG. 4(B) is a sectional view of the rotor core 10 at a sheet surface of the electromagnetic steel sheet 102.

As illustrated in FIG. 4(A), each of the electromagnetic steel sheets 101 includes two bridges 11a and 11b dividing the magnet insertion hole 12 into three regions in the circumferential direction. Each of the bridges 11a and 11b extends to connect an inner side and an outer side of the magnet insertion hole 12 in the radial direction.

A first region 12a in which the permanent magnet 2a is inserted is formed between one end of the magnet insertion hole 12 in the circumferential direction (left end in this embodiment) and the bridge 11a. A second region 12b in which the permanent magnet 2b is inserted is formed between the bridge 11a and the bridge 11b. A third region 12c in which the permanent magnet 2c is inserted is formed between the bridge 11b and the other end of the magnet insertion hole 12 in the circumferential direction (right end in this embodiment).

A positioning part (convex part) 17a is formed on an inner side in the radial direction of an end part of the first region 12a opposite to the bridge 11a. The positioning part 17a contacts an end surface of the permanent magnet 2a in the circumferential direction. The flux barrier 16 is formed on an outer side of the positioning part 17a in the radial direction.

A positioning part (convex part) 17b is formed on an inner side in the radial direction of an end part of the third region 12c opposite to the bridge 11b. The positioning part 17b contacts an end surface of the permanent magnet 2c in the circumferential direction. The flux barrier 16 is formed on an outer side of the positioning part 17b in the radial direction.

That is, the permanent magnet 2a is positioned by the positioning part 17a and the bridge 11a so as not to move in the circumferential direction. The permanent magnet 2b is positioned by the bridge 11a and the bridge 11b so as not to move in the circumferential direction. The permanent magnet 2c is positioned by the bridge 11b and the positioning part 17b so as not to move in the circumferential direction.

Each of the permanent magnets 2a, 2b, and 2c is positioned so as not to move in the radial direction between an inner edge and an outer edge of the magnet insertion hole 12 in the radial direction. In this manner, the permanent magnets 2a, 2b, and 2c are positioned inside the regions 12a, 12b, and 12c of the magnet insertion hole 12.

The bridges 11a and 11b do not only position the permanent magnets 2a, 2b, and 2c in the magnet insertion hole 12, and also enhance strength of the rotor core 10 by connecting the inner side and the outer side of the magnet insertion hole 12 in the radial direction. The electromagnetic steel sheet 101 in which each magnet insertion hole 12 is divided by the bridges 11a and 11b will be also referred to as a first electromagnetic steel sheet.

The bridges 11a and 11b serve as paths through which magnetic flux caused by magnetic field (diamagnetic field) from the stator 5 passes, as will be described later. Thus, in order to suppress demagnetization of the permanent magnets 2a, 2b, and 2c by the diamagnetic field, it is desirable to make widths (lengths in the circumferential direction) of the bridges 11a and 11b as narrow as possible.

When the electromagnetic steel sheet 101 is punched, it is difficult to process a shape finer than the thickness of the electromagnetic steel sheet 101. For this reason, the width of each of the bridges 11a and 11b is set to 1.0 to 1.5 times the thickness of the electromagnetic steel sheet 101. In this embodiment, the thickness of the electromagnetic steel sheet 101 is 0.5 mm, and the width of each of the bridges 11a and 11b is also 0.5 mm.

In the magnet insertion hole 12, openings 15 are formed at a portion on an outer edge (side) of the first region 12a in the radial direction adjacent to the bridge 11a, and a portion on an inner edge of the first region 12a in the radial direction adjacent to the bridge 11a.

Openings 15 are also formed at a portion on an outer edge of the second region 12b in the radial direction adjacent to the bridge 11a, and a portion on an inner edge of the second region 12b in the radial direction adjacent to the bridge 11a.

Openings 15 are also formed at a portion on an outer edge of the third region 12c in the radial direction adjacent to the bridge 11b, and a portion on an inner edge of the third region 12c in the radial direction adjacent to the bridge 11b.

In addition, openings 15 are also formed at a portion on the inner edge of the first region 12a in the radial direction adjacent to the positioning part 17a, and a portion on the inner edge of the third region 12c in the radial direction adjacent to the positioning part 17b.

Each of the openings 15 has a shape of a semicircular groove expanding inward or outward in the radial direction from the magnet insertion hole 12. That is, a circumference of the opening 15 has an arc shape. The openings 15 are provided to reduce stress concentration generated in root parts of the bridges 11a and 11b and root parts of the positioning parts 17a and 17b in the rotor core 10 during rotation of the rotor 1.

The outer edge and the inner edge of the magnet insertion hole 12 in the radial direction extend linearly except for parts where the openings 15 are formed. Each of the edges of the magnet insertion hole 12 extending linearly will be referred to as a linear part 18.

As illustrated in FIG. 4(B), the electromagnetic steel sheet 102 does not include the bridges 11a and 11b (FIG. 4(A)) that divide the magnet insertion hole 12. That is, the magnet insertion hole 12 of the electromagnetic steel sheet 102 includes the first region 12a in which the permanent magnet 2a is inserted, the second region 12b in which the permanent magnet 2b is inserted, and the third region 12c in which the permanent magnet 2c is inserted, and these regions 12a, 12b, and 12c are formed continuously with each other.

The electromagnetic steel sheet 102 does not include the positioning parts 17a and 17b (FIG. 4(A)) at both ends of the magnet insertion hole 12 in the circumferential direction. That is, the magnet insertion hole 12 of the electromagnetic steel sheet 102 does not include parts for positioning the permanent magnets 2a, 2b, and 2c in the circumferential direction. In addition, since the electromagnetic steel sheet 102 does not include the bridges 11a and 11b, the electromagnetic steel sheet 102 does not include the openings 15 (FIG. 4(A)) for reducing stress concentration.

The electromagnetic steel sheet 102 does not include the bridges 11a and 11b, the positioning parts 17a and 17b, and the openings 15, but the electromagnetic steel sheet 102 has a similar configuration to the electromagnetic steel sheet 101 in the other aspects. The electromagnetic steel sheet 102 in which the regions 12a, 12b, and 12c (at least the regions 12a and 12b) of the magnet insertion hole 12 are continuous as above will be also referred to as a second electromagnetic steel sheet.

Figure 5A:
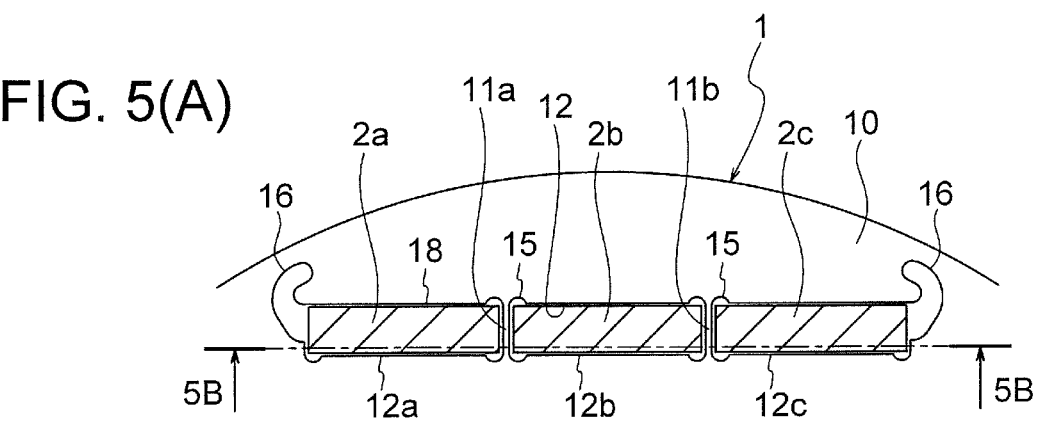
FIG. 5(A) is a sectional view of the rotor of the first embodiment.
Figure 5B:
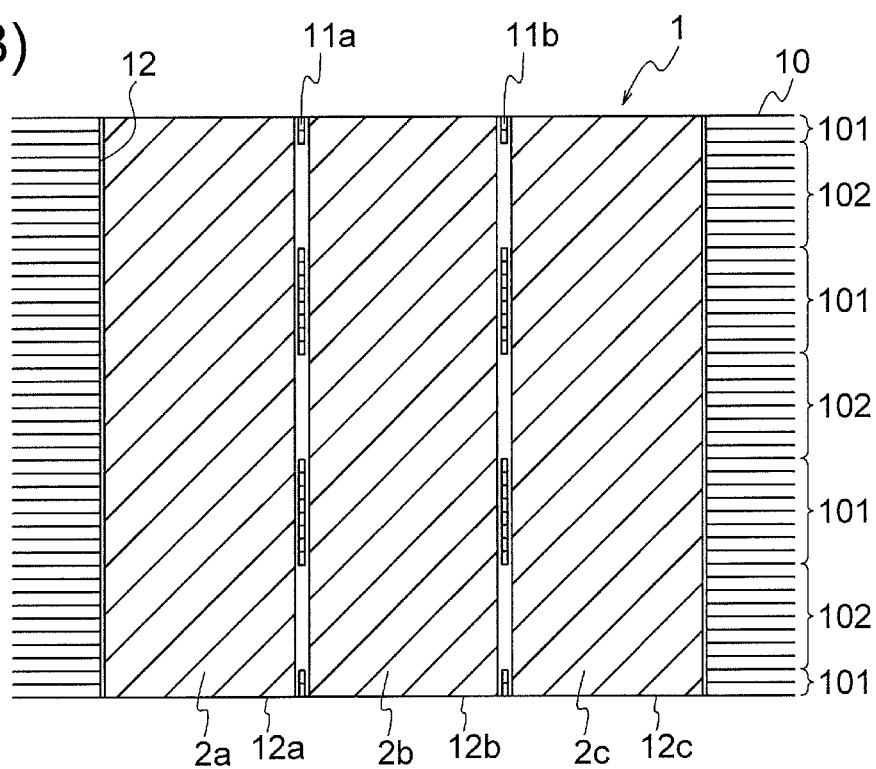
FIG. 5(B) is a sectional view taken along line 5B-5B.

Then, a stacked structure of the electromagnetic steel sheets 101 and the electromagnetic steel sheets 102 will be described. FIG. 5(A) is a sectional view of the rotor 1 at a sheet surface of the electromagnetic steel sheet 101. FIG. 5(B) is a sectional view taken along line 5B-5B in FIG. 5(A) as seen in a direction indicated by arrows.

As illustrated in FIG. 5(B), the rotor core 10 includes two electromagnetic steel sheets 101, eight electromagnetic steel sheets 102, eight electromagnetic steel sheets 101, eight electromagnetic steel sheets 102, eight electromagnetic steel sheets 101, eight electromagnetic steel sheets 102, and two electromagnetic steel sheets 101, from one end (top in the figure) to the other end (bottom in the figure) in the axial direction. The total number of the electromagnetic steel sheets 101 and 102 is 44. The number of the electromagnetic steel sheets 101 will be also referred to as a first number. The number of the electromagnetic steel sheets 102 will be also referred to as a second number.

In the rotor core 10, the electromagnetic steel sheets 101 and the electromagnetic steel sheets 102 are alternately stacked in the axial direction as above. Two electromagnetic steel sheets 101 are disposed on each end of the rotor core 10 in the axial direction. The electromagnetic steel sheets 101 and the electromagnetic steel sheets 102 of the rotor core 10 are stacked symmetrically with respect to a center in the axial direction (stacking direction).

The electromagnetic steel sheets 101 are arranged at equal intervals, and the electromagnetic steel sheets 102 are arranged at equal intervals. That is, the electromagnetic steel sheets 101 are arranged so as to interpose a certain number (eight) of electromagnetic steel sheets 102, and the electromagnetic steel sheets 102 are arranged so as to interpose a certain number (eight) of electromagnetic steel sheets 101.

As described above, since the electromagnetic steel sheet 101 includes the bridges 11a and 11b that divide the magnet insertion hole 12, the electromagnetic steel sheet 101 has strength higher than that of the electromagnetic steel sheet 102. Thus, with the configuration in which the rotor core 10 includes the electromagnetic steel sheets 101 and the electromagnetic steel sheets 102, strength of the rotor 1 can be enhanced.

Since the electromagnetic steel sheet 102 does not include the bridges 11a and 11b dividing the magnet insertion hole 12, magnetic flux caused by diamagnetic field from the stator 5 is less likely to flow into the permanent magnets 2a, 2b, and 2c, as compared to the electromagnetic steel sheet 101. Thus, with the configuration in which the rotor core 10 includes the electromagnetic steel sheets 101 and the electromagnetic steel sheets 102, demagnetization of the permanent magnets 2a, 2b, and 2c can be suppressed.

In addition, two electromagnetic steel sheets 101 are disposed on each end of the rotor core 10 in the axial direction. In a case where two electromagnetic steel sheets 101 are disposed on one end of the rotor core 10 in the axial direction, the bridges 11a and 11b serve as guides when the permanent magnets 2a, 2b, and 2c are inserted into the rotor core 10 from this end, and thus the insertion of the permanent magnets 2a, 2b, and 2c is facilitated.

If each of the bridges 11a and 11b is constituted by one electromagnetic steel sheet 101, the bridges 11a and 11b may be deformed by contact with the permanent magnets 2a, 2b, and 2c during the insertion of the permanent magnets 2a, 2b, and 2c. In the first embodiment, since each of the bridges 11a and 11b is constituted by two electromagnetic steel sheets 101, strength of the bridges 11a and 11b are enhanced, and deformation during the insertion of the permanent magnets 2a, 2b, and 2c can be suppressed.

In addition, in a case where two electromagnetic steel sheets 101 are disposed on each end of the rotor core 10 in the axial direction, the bridges 11a and 11b serve as guides when the permanent magnets 2a, 2b, and 2c are inserted into the rotor core 10 from either end in the axial direction. Thus, the insertion operation of the permanent magnets 2a, 2b, and 2c is further facilitated.

In the example illustrated in FIG. 5(B), two electromagnetic steel sheets 101 are stacked on each end of the rotor core 10 in the axial direction, but it is sufficient that two or more electromagnetic steel sheets 101 are stacked on at least one end of the rotor core 10 in the axial direction.

Comparative Example

Figure 6A:
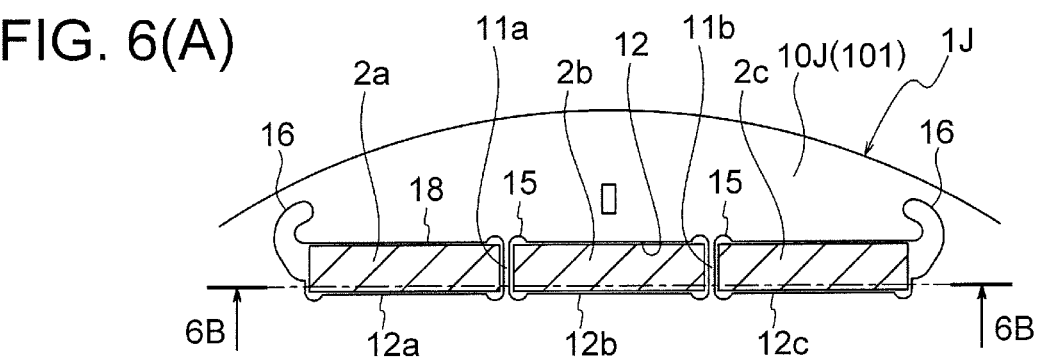
FIG. 6(A) is a sectional view of an electromagnetic steel sheet of a rotor according to a comparative example.
Figure 6B:
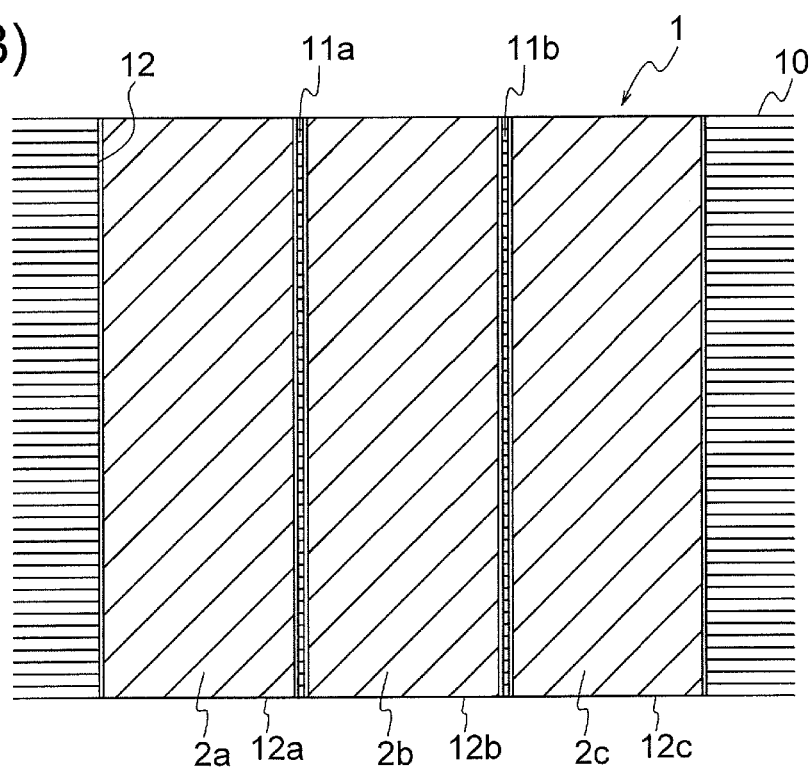
FIG. 6(B) is a sectional view taken along line 6B-6B.

Here, for comparison with the rotor 1 of the first embodiment, a rotor 1J of a comparative example will be described. FIG. 6(A) is a sectional view of the rotor 1J of the comparative example at a sheet surface of the electromagnetic steel sheet 101. FIG. 6(B) is a sectional view taken along line 6B-6B in FIG. 6(A) as seen in a direction indicated by arrows.

A rotor core 10J of the comparative example is constituted only by electromagnetic steel sheets 101 and does not include electromagnetic steel sheet 102. All of the electromagnetic steel sheets (electromagnetic steel sheets 101) of the rotor core 10J include the bridges 11a and 11b, and thus the rotor 1J has high strength. However, magnetic flux caused by diamagnetic field from the stator 5 is likely to flow into the permanent magnets 2a, 2b, and 2c by way of the bridges 11a and 11b, and thus demagnetization of the permanent magnets 2a, 2b, and 2c is likely to occur.

(Functions)

Figure 7A:
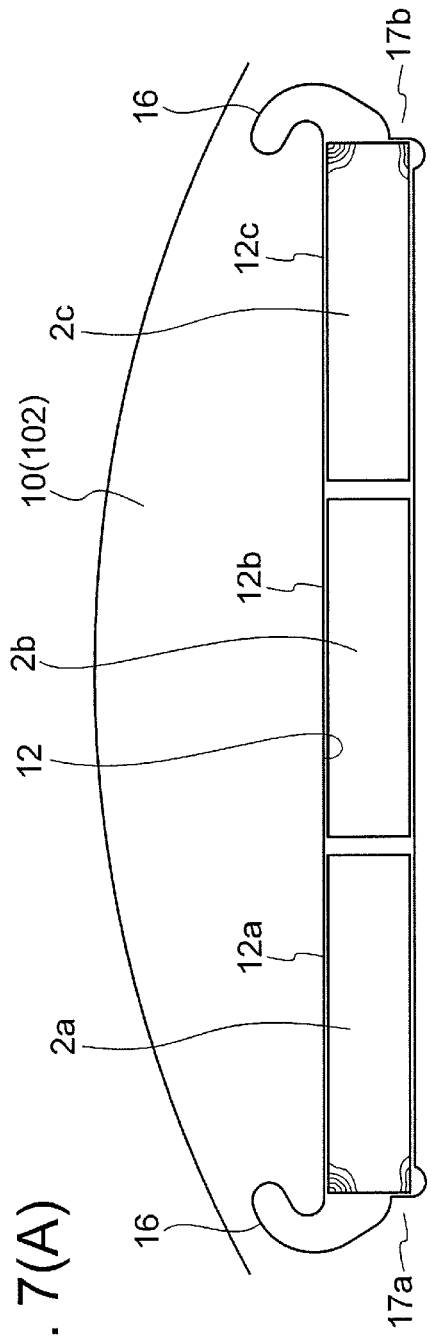
FIG. 7(A) is a diagram for explaining a state where demagnetization occurs in permanent magnets in a magnet insertion hole in a first electromagnetic steel sheet of the rotor of the first embodiment.
Figure 7B:
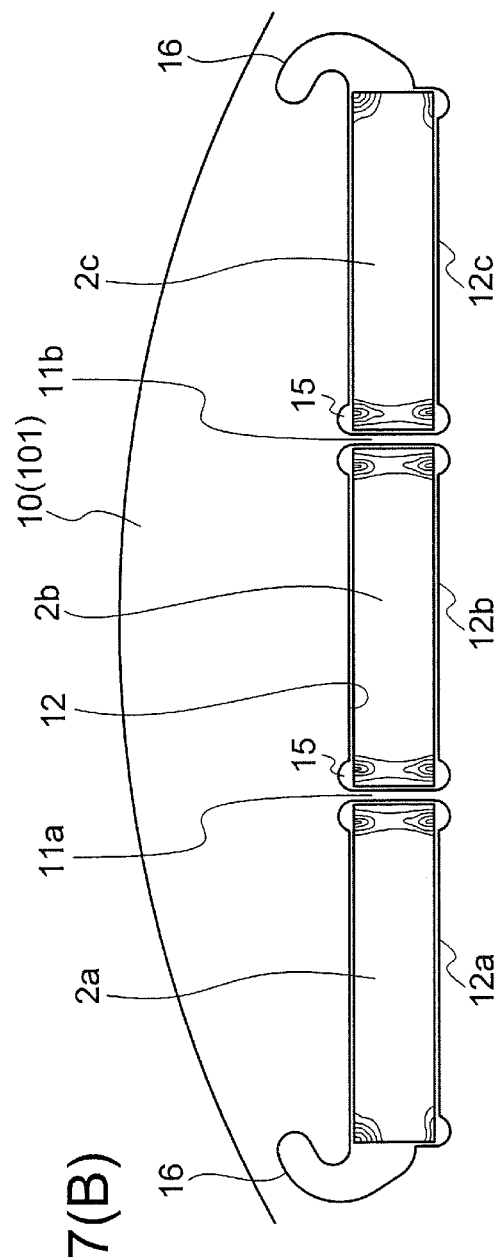
FIG. 7(B) is a diagram for explaining a state where demagnetization occurs in permanent magnets in a magnet insertion hole of a second electromagnetic steel sheet of the rotor of the first embodiment.

Then, function to suppress demagnetization of the permanent magnets 2a, 2b, and 2c in the first embodiment will be described. FIGS. 7(A) and 7(B) are schematic views showing magnetic flux density distributions occurring in the permanent magnets 2a, 2b, and 2c in the magnet insertion hole 12 by diamagnetic field from the stator 5. FIG. 7(A) shows a magnetic flux density distribution in the permanent magnets 2a, 2b, and 2c in the magnet insertion hole 12 of the electromagnetic steel sheets 102 including no bridges 11a and 11b. FIG. 7(B) shows a magnetic flux density distribution in the permanent magnets 2a, 2b, and 2c in the magnet insertion hole 12 of the electromagnetic steel sheet 101 including the bridges 11a and 11b.

Magnetic flux caused by diamagnetic field from the stator 5 passes through a core part having a low magnetic resistance. Thus, as illustrated in FIG. 7(A), in the permanent magnets 2a, 2b, and 2c in the magnet insertion hole 12 of the electromagnetic steel sheets 102, demagnetization gradually proceeds from corners of the permanent magnets 2a and 2c near the flux barriers 16.

In contrast, as illustrated in FIG. 7(B), in the permanent magnets 2a, 2b, and 2c in the magnet insertion hole 12 of the electromagnetic steel sheets 101, demagnetization also proceeds from corners of the permanent magnets 2a, 2b, and 2c near the root parts of the bridges 11a and 11b. Magnetic flux is especially likely to flow into the corners of the permanent magnets 2a, 2b, and 2c near the root parts of the bridges 11a and 11b, and thus demagnetization is likely to proceed.

As described above, when the electromagnetic steel sheet 101 and the electromagnetic steel sheet 102 are compared to each other, demagnetization of the permanent magnets 2a, 2b, and 2c in the magnet insertion holes 12 is less likely to occur in the electromagnetic steel sheet 102. Thus, in the rotor core 10 constituted by the electromagnetic steel sheets 101 and the electromagnetic steel sheets 102, demagnetization of the permanent magnets 2a, 2b, and 2c can be suppressed, as compared with the rotor core 10J constituted only by the electromagnetic steel sheets 101 (FIG. 6(B)).

Next, a relationship between a width of each of the bridges 11a and 11b and strength of the rotor core 10 will be described. During operation of the motor 100, a centrifugal force due to rotation is exerted on the rotor 1. In particular, a part of the rotor core 10 on an outer side of each magnet insertion hole 12 in the radial direction is pressed outward in the radial direction by the permanent magnets 2a, 2b, and 2c. Thus, stress concentration occurs on the root parts of the bridges 11a and 11b of the rotor core 10 (i.e., borders between the linear parts 18 and the openings 15 of the magnet insertion hole 12).

If the openings 15 are made larger, stress concentration is reduced. However, since air in the openings 15 is non-magnetic material, enlargement of the openings 15 leads to enlargement of non-magnetic parts facing the permanent magnets 2a, 2b, and 2c, and results in a decrease in output of the motor 100. In view of this, the size of each of the openings 15 is restricted.

Figure 8A:
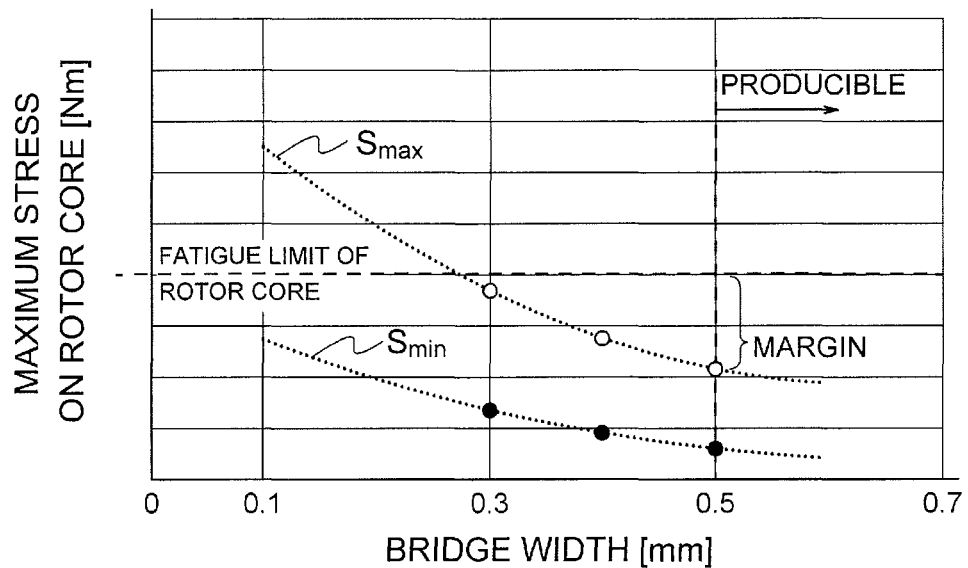
FIG. 8(A) is a schematic diagram for explaining stress occurring in a rotor core in the comparative example.

FIG. 8(A) is a graph showing a change in a maximum stress generated on the rotor core 10J in a case where the width of each of the bridges 11a and 11b of the rotor 1J of the comparative example (FIG. 6(B)) is changed. A horizontal axis represents the width of each of the bridges 11a and 11b, and a vertical axis represents a maximum stress generated on the rotor core 10J. The maximum stress generated on the rotor core 10J is a stress generated on the border between the linear part 18 and the opening 15 of the magnet insertion hole 12, as described above.

FIG. 8(A) shows a maximum stress at a maximum speed (curve Smax) and a maximum stress at a minimum speed (curve Smin) in a range of a rotation speed in a case where the motor 100 is used in the compressor 300 (FIG. 17) or the like (i.e., a practical rotation speed range). As the rotation speed of the rotor 1J increases, stress concentration due to a centrifugal force increases, and the maximum stress increases. FIG. 8(A) also shows a fatigue limit of the rotor core 10J.

From FIG. 8(A), it is understood that the maximum stress generated on the rotor core 10J decreases as the width of each of the bridges 11a and 11b increases. As described above, when the width of each of the bridges 11a and 11b is less than 0.5 mm (thickness of the electromagnetic steel sheet), production is difficult. When the width of each of the bridges 11a and 11b is 0.5 mm, the maximum stress generated on the rotor core 10J at the maximum speed is significantly lower than the fatigue limit of the rotor core 10J.

That is, in the rotor core 10J of the comparative example (FIG. 6(B)), even in a case where the width of the bridges 11a and 11b is a producible minimum width (0.5 mm), the maximum stress is significantly lower than the fatigue limit of the rotor core 10J. Thus, the rotor core 10J of the comparative example has strength with a sufficient margin.

Figure 8B:
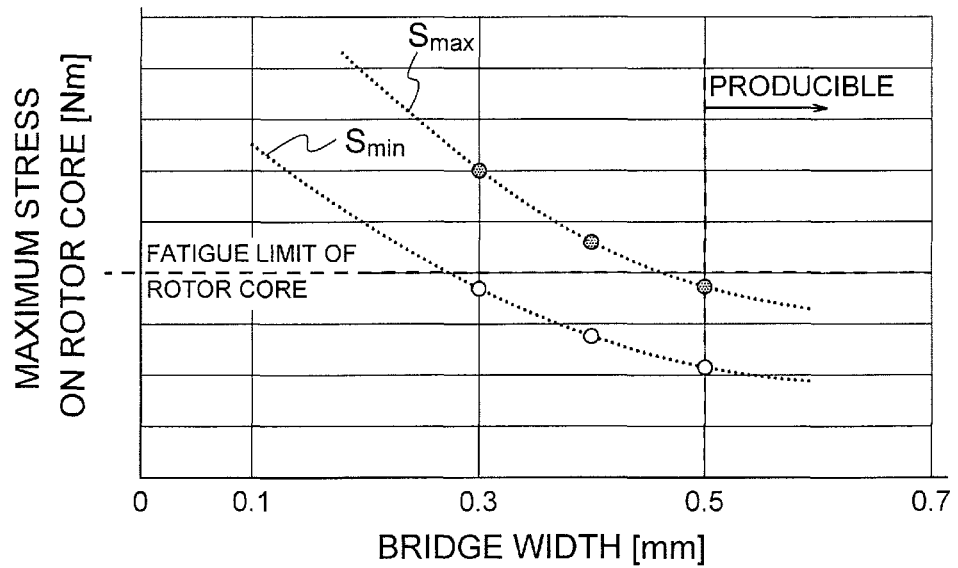
FIG. 8(B) is a schematic diagram for explaining stress occurring in a rotor core in the first embodiment.

FIG. 8(B) is a graph showing a change in a maximum stress generated on the rotor core 10 in a case where the width of each of the bridges 11a and 11b of the electromagnetic steel sheet 101 of the rotor 1 of the first embodiment is changed. A horizontal axis represents the width of each of the bridges 11a and 11b, and a vertical axis represents a maximum stress generated on the rotor core 10.

In a manner similar to FIG. 8(A), FIG. 8(B) shows a maximum stress at a maximum speed (curve Smax) and a maximum stress at a minimum speed (curve Smin) in the practical rotation speed range of the motor 100. FIG. 8(B) also shows a fatigue limit of the rotor core 10.

From FIG. 8(B), it is understood that the maximum stress generated on the rotor core 10 decreases as the width of each of the bridges 11a and 11b increases. When the width of the bridges 11a and 11b is a producible minimum width (0.5 mm), the maximum stress generated on the rotor core 10 at the maximum speed is higher than that of the comparative example in FIG. 8(A), but is sufficiently lower than the fatigue limit of the rotor core 10.

From this result, it is understood that the rotor core 10 of the first embodiment constituted by the electromagnetic steel sheets 101 and the electromagnetic steel sheets 102 has strength lower than that of the rotor core 10 of the comparative example constituted only by the electromagnetic steel sheets 101, but still has a sufficient strength.

Advantages of Embodiment

As described above, the rotor core 10 according to the first embodiment includes the electromagnetic steel sheets 101 (first electromagnetic steel sheets) and the electromagnetic steel sheets 102 (second electromagnetic steel sheets), and two or more electromagnetic steel sheets 101 are provided on at least one end of the rotor core 10. In the electromagnetic steel sheet 101, the bridges 11a and 11b divide the magnet insertion hole 12 into the regions 12a, 12b, and 12c. In the electromagnetic steel sheets 102, the regions 12a, 12b, and 12c of the magnet insertion hole 12 are formed continuously with each other. Thus, demagnetization of the permanent magnets 2a, 2b, and 2c can be suppressed, and strength of the rotor core 10 can be enhanced. When the permanent magnets 2a, 2b, and 2c are inserted into the magnet insertion hole 12, the bridges 11a and 11b of the electromagnetic steel sheets 101 serve as guides, and thus the insertion of the permanent magnets 2a, 2b, and 2c can be facilitated.

In particular, two or more electromagnetic steel sheets 101 are disposed on at least one end of the rotor core 10, and thus strength of the bridges 11a and 11b can be enhanced, and deformation of the bridges 11a and 11b during the insertion of the permanent magnets 2a, 2b, and 2c can be suppressed.

In addition, two or more electromagnetic steel sheets 101 are disposed on each end of the rotor core 10 in the axial direction, and thus the bridges 11a and 11b serve as guides when the permanent magnets 2a, 2b, and 2c are inserted into the rotor core 10 from either side in the axial direction. Therefore, the insertion of the permanent magnets 2a, 2b, and 2c can be further facilitated.

The electromagnetic steel sheets 101 of the rotor core 10 are arranged at equal intervals in the axial direction, and the electromagnetic steel sheets 102 are arranged at equal intervals in the axial direction. Thus, weight balance of the rotor core 10 in the axial direction can be enhanced. The electromagnetic steel sheets 101 and the electromagnetic steel sheets 102 are stacked symmetrically with respect to the center in the axial direction, and thus weight balance of the rotor core 10 in the axial direction can be enhanced.

The width (length in the circumferential direction) of each of the bridges 11a and 11b is less than or equal to 1.5 times the thickness of the electromagnetic steel sheet 101, and thus magnetic flux caused by diamagnetic field from the stator 5 is less likely to flow into the permanent magnets 2a, 2b, and 2c by way of the bridges 11a and 11b, and thus demagnetization of the permanent magnets 2a, 2b, and 2c can be suppressed.

In the electromagnetic steel sheets 101, the openings 15 are formed at portions on the outer edge and the inner edge of the magnet insertion hole 12 in the radial direction adjacent to the bridges 11a and 11b, and thus stress concentration in the root parts of the bridges 11a and 11b can be reduced.

The positioning parts 17a and 17b for positioning the permanent magnets 2a and 2c in the circumferential direction are provided on both ends of the electromagnetic steel sheets 101 in the circumferential direction, positioning of the permanent magnets 2a and 2c can be effectively performed.

Second Embodiment

Figure 9A:
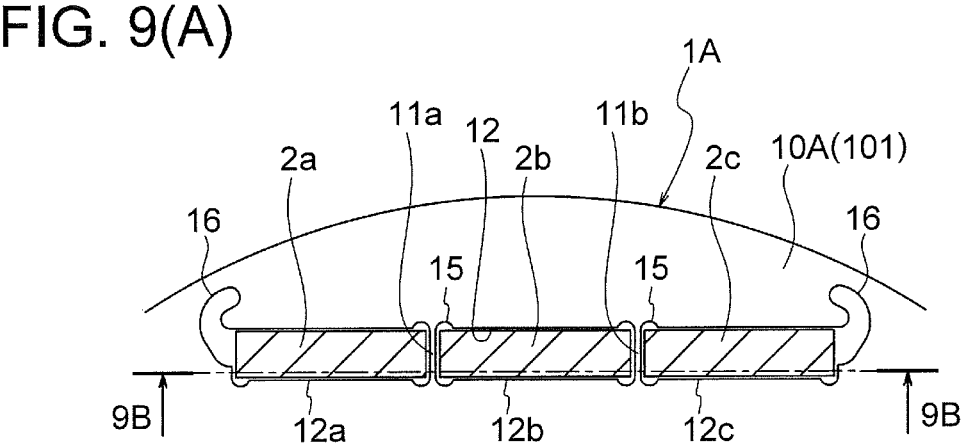
FIG. 9(A) is a sectional view of a rotor according to a second embodiment.
Figure 9B:
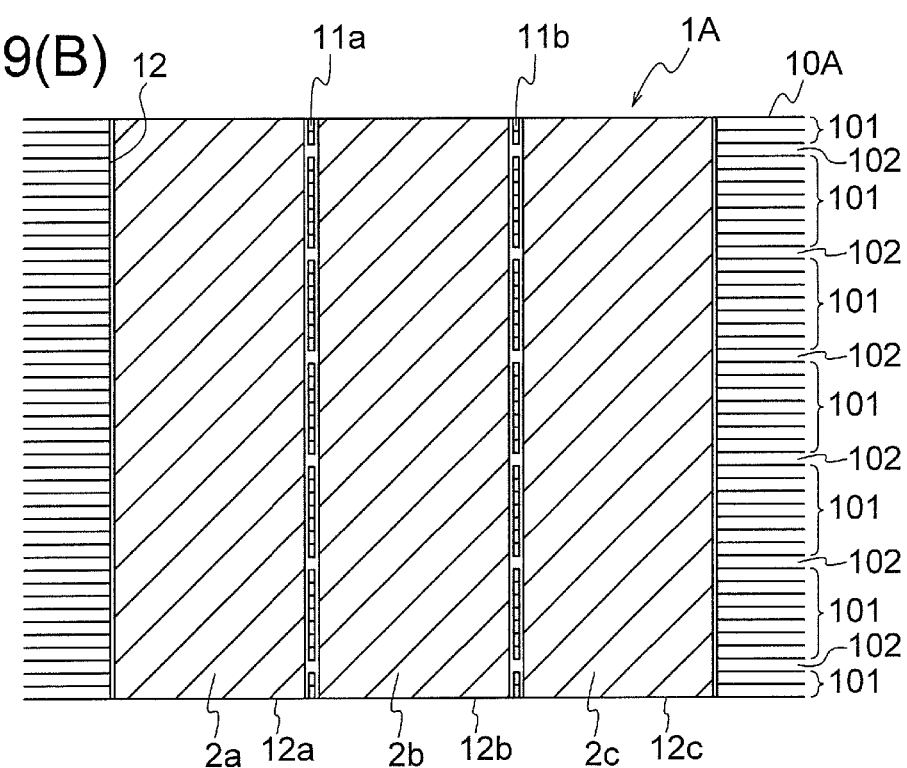
FIG. 9(B) is a sectional view taken along line 9B-9B.

Next, a second embodiment of the present invention will be described. FIG. 9(A) is a sectional view of a rotor 1A according to the second embodiment at a sheet surface of the electromagnetic steel sheet 101. FIG. 9(B) is a sectional view taken along line 9B-9B in FIG. 9(A) as seen in a direction indicated by arrows.

As illustrated in FIG. 9(B), the rotor core 10A includes two electromagnetic steel sheets 101, one electromagnetic steel sheet 102, seven electromagnetic steel sheets 101, one electromagnetic steel sheet 102, seven electromagnetic steel sheets 101, one electromagnetic steel sheet 102, seven electromagnetic steel sheets 101, one electromagnetic steel sheet 102, seven electromagnetic steel sheets 101, one electromagnetic steel sheet 102, seven electromagnetic steel sheets 101, one electromagnetic steel sheet 102, and two electromagnetic steel sheets 101, from one end (top in the figure) to the other end (bottom in the figure) in the axial direction. The total number of the electromagnetic steel sheets 101 and 102 is 45.

In the rotor core 10A of the second embodiment, the electromagnetic steel sheets 101 (first electromagnetic steel sheets) and the electromagnetic steel sheets 102 (second electromagnetic steel sheets) are alternately arranged in the axial direction. Two electromagnetic steel sheets 101 are disposed on each end of the rotor core 10A in the axial direction. The electromagnetic steel sheets 101 and the electromagnetic steel sheets 102 are stacked symmetrically with respect to the center of the rotor core 10A in the axial direction.

The electromagnetic steel sheets 101 are arranged at equal intervals, and the electromagnetic steel sheets 102 are arranged at equal intervals. That is, the electromagnetic steel sheets 101 are arranged so as to interpose a certain number (one) of electromagnetic steel sheet 102, and the electromagnetic steel sheets 102 are arranged so as to interpose a certain number (seven) of electromagnetic steel sheets 101. In other words, the electromagnetic steel sheets 102 are arranged so as to interpose the electromagnetic steel sheets 101 the number (third number) of which is greater than or equal to the number of poles N (six in this example).

Figure 9C:
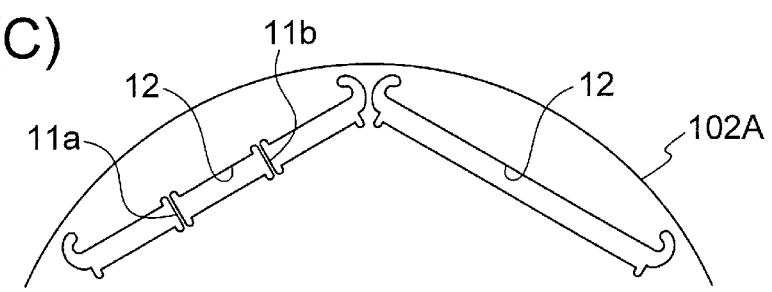
FIG. 9(C) is a diagram illustrating another configuration example of an electromagnetic steel sheet.

In this case, so-called rotary stacking can be performed except for both ends of the rotor core 10A in the axial direction. That is, as illustrated in FIG. 9(C), electromagnetic steel sheets 102A each including both of the magnet insertion hole 12 divided by the bridges 11a and 11b and the magnet insertion hole 12 which is not divided by the bridges 11a and 11b can be stacked while rotating each electromagnetic steel sheet 102A about the axis C1 by 60 degrees (360 degrees divided by the number of poles). In this embodiment, the electromagnetic steel sheets 102A each including five magnet insertion holes 12 each of which is divided by the bridges 11a and 11b and one magnet insertion hole 12 which is not divided by the bridges 11a and 11b are stacked while rotating each electromagnetic steel sheet 102A about the axis C1 by 60 degrees. Accordingly, degree of freedom in configuration of the rotor core 10A can be enhanced.

In the case where the rotor core 10A is formed by rotary stacking, the rotor core 10A can be formed of the electromagnetic steel sheets 102A illustrated in FIG. 9(C) except for two electromagnetic steel sheets 101 at each end of the rotor core 10A in the axial direction. The electromagnetic steel sheet 102A includes at least one magnet insertion hole 12 which is not divided by the bridge, and this electromagnetic steel sheet 102A will be also referred to as a second electromagnetic steel sheet.

Other components of the second embodiment are similar to those of the first embodiment. Arrangement and the numbers of the electromagnetic steel sheets 101 and the electromagnetic steel sheets 102 are not limited to the examples described above. In FIG. 9(B), two electromagnetic steel sheets 101 are disposed on each end of the rotor core 10A in the axial direction, but it is sufficient that two or more electromagnetic steel sheets 101 are disposed on at least one end of the rotor core 10A in the axial direction.

As described above, in the second embodiment, the rotor core 10A includes the electromagnetic steel sheets 101 (first electromagnetic steel sheets) and the electromagnetic steel sheets 102 (second electromagnetic steel sheets) as in the first embodiment. Thus, demagnetization of the permanent magnets 2a, 2b, and 2c can be suppressed, strength of the rotor core 10A can be enhanced, and the insertion of the permanent magnets 2a, 2b, and 2c can be facilitated.

The electromagnetic steel sheets 101 and the electromagnetic steel sheets 102 are both arranged at equal intervals in the axial direction and are stacked symmetrically with respect to the center in the axial direction, and thus weight balance of the rotor core 10A in the axial direction can be enhanced.

By forming the rotor core 10A by stacking the electromagnetic steel sheets 102A (FIG. 9(C)) while rotating the electromagnetic steel sheets 102A, degree of freedom in configuration of the rotor core 10A can be increased.

Third Embodiment

Figure 10A:
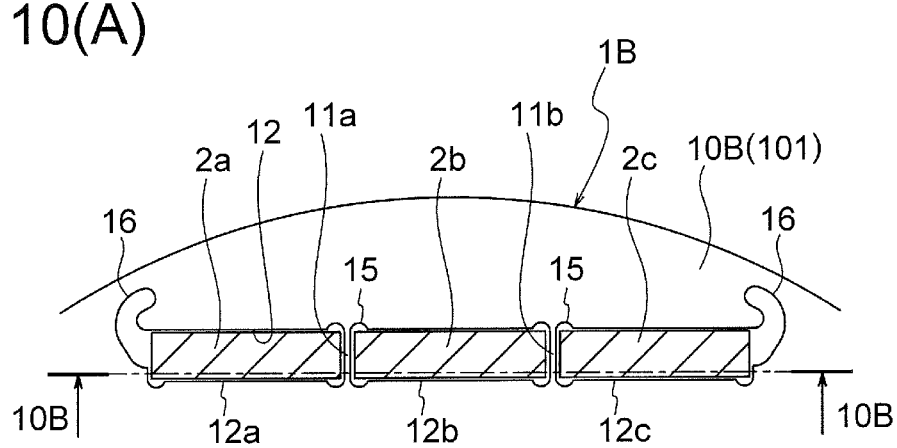
FIG. 10(A) is a sectional view of a rotor according to a third embodiment and FIG. 10(B) is a sectional view taken along line 10B-10B.
Figure 10B:
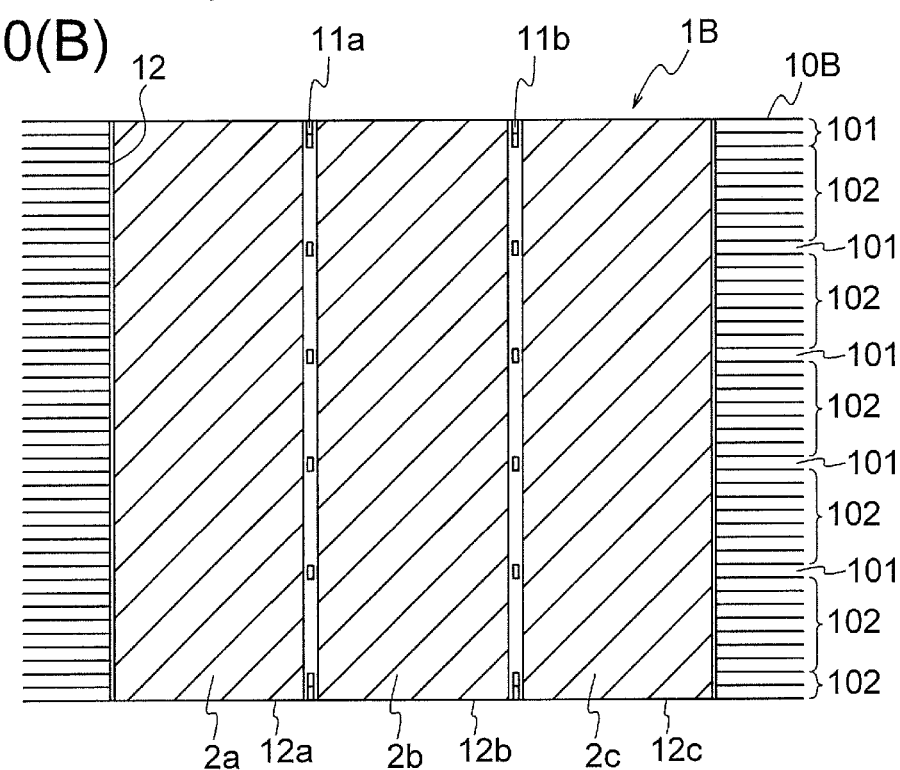

Next, a third embodiment of the present invention will be described. FIG. 10(A) is a sectional view of a rotor 1B according to the third embodiment at a sheet surface of the electromagnetic steel sheet 101. FIG. 10(B) is a sectional view taken along line 10B-10B in FIG. 10(A) as seen in a direction indicated by arrows.

As illustrated in FIG. 10(B), the rotor core 10B includes two electromagnetic steel sheets 101, seven electromagnetic steel sheets 102, one electromagnetic steel sheet 101, seven electromagnetic steel sheets 102, one electromagnetic steel sheet 101, seven electromagnetic steel sheets 102, one electromagnetic steel sheet 101, seven electromagnetic steel sheets 102, one electromagnetic steel sheet 101, seven electromagnetic steel sheets 102, and two electromagnetic steel sheets 101, from one end (top in the figure) to the other end (bottom in the figure) in the axial direction. The total number of the electromagnetic steel sheets 101 and 102 is 43.

In the rotor core 10B of the third embodiment, the electromagnetic steel sheets 101 (first electromagnetic steel sheets) and the electromagnetic steel sheets 102 (second electromagnetic steel sheets) are alternately arranged in the axial direction. Two electromagnetic steel sheets 101 are disposed on each end of the rotor core 10B in the axial direction. The electromagnetic steel sheets 101 and the electromagnetic steel sheets 102 of the rotor core 10B are stacked symmetrically with respect to the center in the axial direction.

The electromagnetic steel sheets 101 are arranged at equal intervals, and the electromagnetic steel sheets 102 are arranged at equal intervals. That is, the electromagnetic steel sheets 101 are arranged so as to interpose a certain number (seven) of electromagnetic steel sheets 102, and the electromagnetic steel sheets 102 are arranged so as to interpose a certain number (one) of electromagnetic steel sheet 101. In this embodiment, the electromagnetic steel sheets 101 are disposed so as to interpose the electromagnetic steel sheets 102 the number of which is greater than or equal to the number of poles N (six in this example).

In this case, so-called rotary stacking can be performed except for both ends of the rotor core 10B in the axial direction. That is, as illustrated in FIG. 9(C), the electromagnetic steel sheets 102A each including the magnet insertion hole 12 divided by the bridges 11a and 11b and the magnet insertion hole 12 which is not divided by the bridges 11a and 11b can be stacked while rotating each electromagnetic steel sheet 102A about an axis C1 by 60 degrees. In this embodiment, the electromagnetic steel sheets 102A each including one magnet insertion hole 12 divided by the bridges 11a and 11b and five magnet insertion holes 12 each of which is not divided by the bridges 11a and 11b are stacked while rotating each electromagnetic steel sheet 102A about the axis C1 by 60 degrees. Accordingly, degree of freedom in configuration of the rotor core 10B can be enhanced.

In the case where the rotor core 10B is formed by rotary stacking, the rotor core 10B can be formed of the electromagnetic steel sheets 102A illustrated in FIG. 9(C) except for two electromagnetic steel sheets 101 at each end of the rotor core 10B in the axial direction.

Each of the electromagnetic steel sheets 101 is stacked as one sheet except for both ends of the rotor core 10B in the axial direction. In these electromagnetic steel sheets 101, the bridges 11a and 11b are constituted by one electromagnetic steel sheet. However, in parts except for the ends of the rotor core 10B in the axial direction, the bridges 11a and 11b are less likely to contact the permanent magnets 2a, 2b, and 2c during the insertion of the permanent magnets 2a, 2b, and 2c, and thus deformation or the like of the bridges 11a and 11b is less likely to occur.

Other components of the third embodiment are similar to those of the first embodiment. Arrangement and the numbers of the electromagnetic steel sheets 101 and the electromagnetic steel sheets 102 are not limited to the examples described above. In FIG. 10(B), two electromagnetic steel sheets 101 are disposed on each end of the rotor core 10B in the axial direction, but it is sufficient that two or more electromagnetic steel sheets 101 are disposed on at least one end of the rotor core 10B in the axial direction.

As described above, in the third embodiment, the rotor core 10B includes the electromagnetic steel sheets 101 (first electromagnetic steel sheets) and the electromagnetic steel sheets 102 (second electromagnetic steel sheets) as in the first embodiment, demagnetization of the permanent magnets 2a, 2b, and 2c can be suppressed, strength of the rotor core 10B can be enhanced, and the insertion of the permanent magnets 2a, 2b, and 2c can be facilitated.

The electromagnetic steel sheets 101 and the electromagnetic steel sheets 102 are both arranged at equal intervals in the axial direction and are stacked symmetrically with respect to the center in the axial direction, and thus weight balance of the rotor core 10B in the axial direction can be enhanced.

The rotor core 10B is formed by stacking the electromagnetic steel sheets 102A while rotating the electromagnetic steel sheets 102A (FIG. 9(C)). Thus, degree of freedom in configuration of the rotor core 10B can be increased.

Fourth Embodiment

Figure 11A:
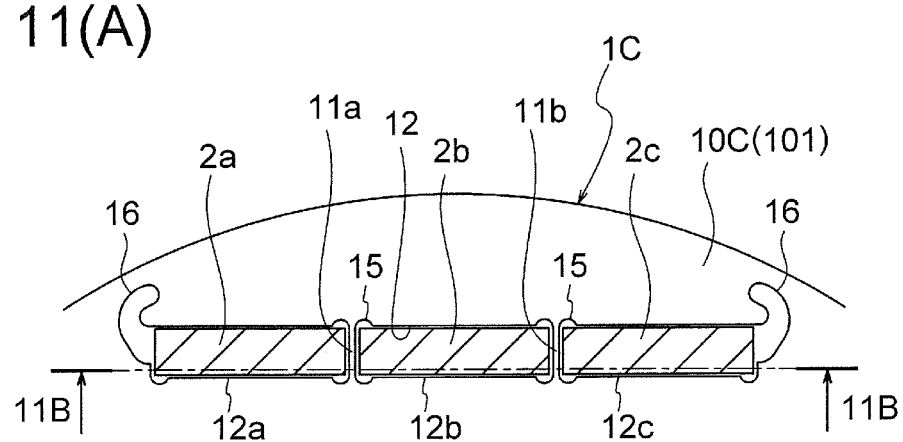
FIG. 11(A) is a sectional view of a rotor according to a fourth embodiment.
Figure 11B:
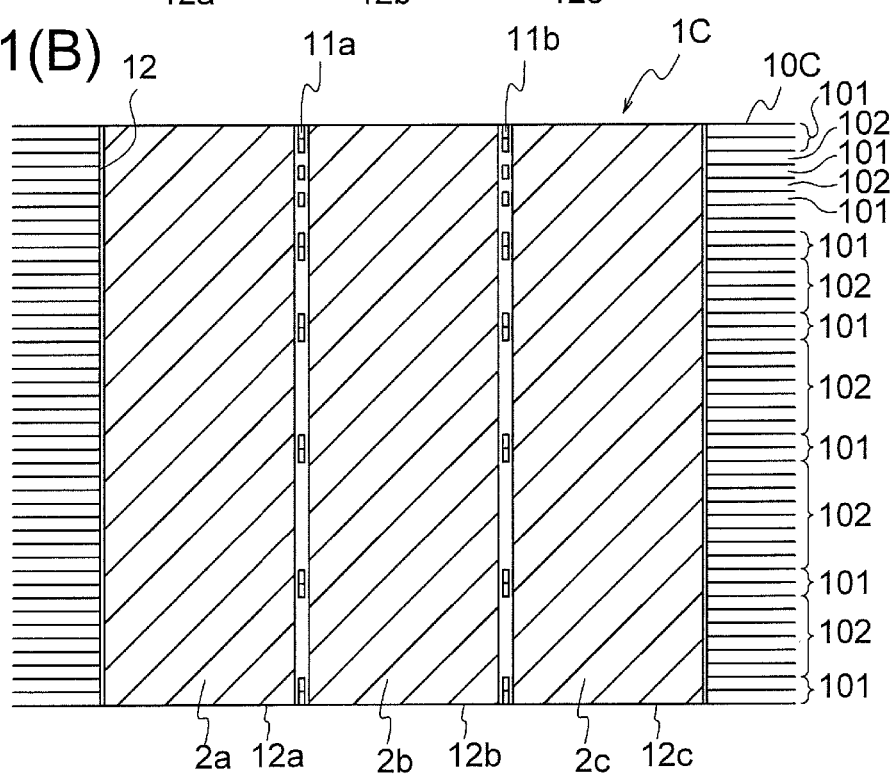
FIG. 11(B) is a sectional view taken along line 11B-11B.

Next, a fourth embodiment of the present invention will be described. FIG. 11(A) is a sectional view of a rotor 1C at a sheet surface of the electromagnetic steel sheet 101 according to the fourth embodiment. FIG. 11(B) is a sectional view taken along line 11B-11B in FIG. 11(A) as seen in a direction indicated by arrows.

As illustrated in FIG. 11(B), the rotor core 10C includes two electromagnetic steel sheets 101, one electromagnetic steel sheet 102, one electromagnetic steel sheet 101, one electromagnetic steel sheet 102, one electromagnetic steel sheet 101, two electromagnetic steel sheets 102, two electromagnetic steel sheets 101, four electromagnetic steel sheets 102, two electromagnetic steel sheets 101, seven electromagnetic steel sheets 102, two electromagnetic steel sheets 101, eight electromagnetic steel sheets 102, two electromagnetic steel sheets 101, six electromagnetic steel sheets 102, and two electromagnetic steel sheets 101, from one end (top in the figure) to the other end (bottom in the figure) in the axial direction. The total number of the electromagnetic steel sheets 101 and 102 is 43.

That is, in the fourth embodiment, the electromagnetic steel sheets 101 (first electromagnetic steel sheets) are arranged at unequal intervals, and the electromagnetic steel sheets 102 (second electromagnetic steel sheets) are arranged at unequal intervals. In other words, the number of successively arranged sheets and arrangement intervals of the electromagnetic steel sheets 101 vary in the axial direction, and the number of successively arranged sheets and arrangement intervals of the electromagnetic steel sheets 102 vary in the axial direction.

In particular, the electromagnetic steel sheets 101 and the electromagnetic steel sheets 102 are arranged in such a manner that arrangement density (the number of sheets per a unit length in the axial direction) of the electromagnetic steel sheets 101 increases toward one end (top in the figure) of the rotor core 10C in the axial direction, whereas arrangement density of the electromagnetic steel sheets 102 increases toward the other end (bottom in the figure) of the rotor core 10C in the axial direction.

That is, density with which the bridges 11a and 11b are arranged increases toward one end (top in the figure) of the rotor core 10C in the axial direction. Thus, when the permanent magnets 2a, 2b, and 2c are inserted from the one end of the rotor core 10C, the number of parts guiding the permanent magnets 2a, 2b, and 2c increases, and the insertion of the permanent magnets 2a, 2b, and 2c is facilitated.

Other components of the fourth embodiment are similar to those of the first embodiment. Arrangement and the numbers of the electromagnetic steel sheets 101 and the electromagnetic steel sheets 102 are not limited to the examples described above. In FIG. 11(B), two electromagnetic steel sheets 101 are disposed on each end of the rotor core 10C in the axial direction, but it is sufficient that two or more electromagnetic steel sheets 101 are disposed on at least one end of the rotor core 10C in the axial direction.

As described above, in the fourth embodiment, the rotor core 10C includes the electromagnetic steel sheets 101 (first electromagnetic steel sheets) and the electromagnetic steel sheets 102 (second electromagnetic steel sheets) as in the first embodiment, and thus demagnetization of the permanent magnets 2a, 2b, and 2c can be suppressed, strength of the rotor core 10C can be enhanced, and the insertion of the permanent magnets 2a, 2b, and 2c can be facilitated.

The electromagnetic steel sheets 101 and the electromagnetic steel sheets 102 are stacked in such a manner that the arrangement density of the electromagnetic steel sheets 101 increases toward one end of the rotor core 10C in the axial direction. Thus, the insertion of the permanent magnets 2a, 2b, and 2c can be further facilitated.

Fifth Embodiment

Figure 12A:
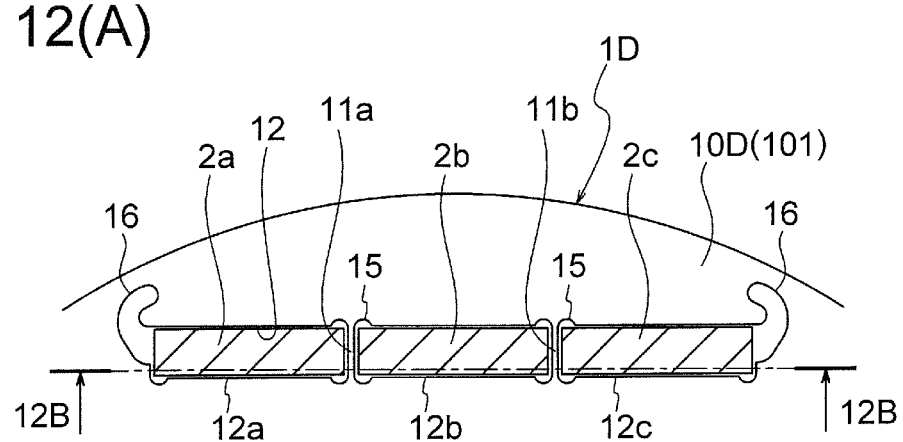
FIG. 12(A) is a sectional view of a rotor according to a fifth embodiment.
Figure 12B:
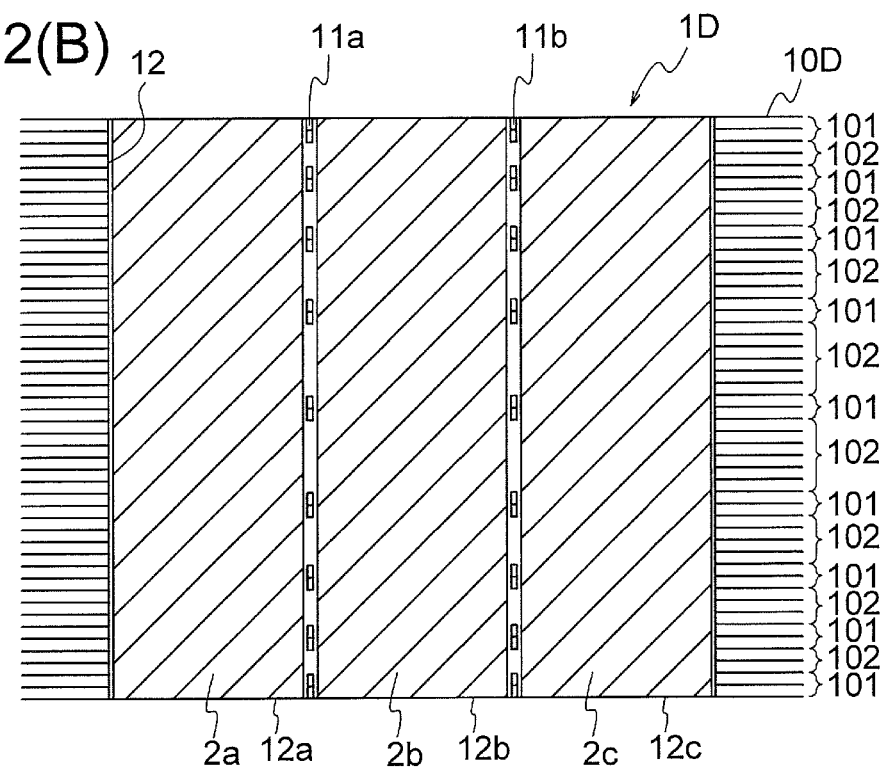
FIG. 12(B) is a sectional view taken along line 12B-12B.

Next, a fifth embodiment of the present invention will be described. FIG. 12(A) is a sectional view of a rotor 1D according to the fifth embodiment at a sheet surface of the electromagnetic steel sheet 101. FIG. 12(B) is a sectional view taken along line 12B-12B in FIG. 12(A) as seen in a direction indicated by arrows.

As illustrated in FIG. 12(B), the rotor core 10D includes two electromagnetic steel sheets 101, two electromagnetic steel sheets 102, two electromagnetic steel sheets 101, three electromagnetic steel sheets 102, two electromagnetic steel sheets 101, four electromagnetic steel sheets 102, two electromagnetic steel sheets 101, six electromagnetic steel sheets 102, two electromagnetic steel sheets 101, four electromagnetic steel sheets 102, two electromagnetic steel sheets 101, three electromagnetic steel sheets 102, two electromagnetic steel sheets 101, two electromagnetic steel sheets 102, and two electromagnetic steel sheets 101, from one end (top in the figure) to the other end (bottom in the figure) in the axial direction. The total number of the electromagnetic steel sheets 101 and 102 is 48.

That is, in the fifth embodiment, the electromagnetic steel sheets 101 (first electromagnetic steel sheets) are arranged at unequal intervals, and the electromagnetic steel sheets 102 (second electromagnetic steel sheets) are arranged at unequal intervals. In other words, the number of successively arranged sheets and arrangement intervals of the electromagnetic steel sheets 101 vary in the axial direction, and the number of successively arranged sheets and arrangement intervals of the electromagnetic steel sheets 102 vary in the axial direction.

In particular, the electromagnetic steel sheets 101 and the electromagnetic steel sheets 102 are arranged in such a manner that the arrangement density of the electromagnetic steel sheets 101 increases toward each end (each of both ends in the axial direction) of the rotor core 10D in the axial direction, whereas the arrangement density of the electromagnetic steel sheets 102 increases toward a center of the rotor core 10D in the axial direction.

That is, density with which the bridges 11a and 11b are arranged increases toward each end of the rotor core 10D in the axial direction. Thus, when the permanent magnets 2a, 2b, and 2c are inserted from either end of the rotor core 10D, the number of parts guiding the permanent magnets 2a, 2b, and 2c increases, and thus the insertion of the permanent magnets 2a, 2b, and 2c is facilitated.

In addition, the electromagnetic steel sheets 101 and the electromagnetic steel sheets 102 are stacked symmetrically with respect to the center in the axial direction (stacking direction). Thus, weight balance of the rotor core 10D in the axial direction can be enhanced.

Other components of the fifth embodiment are similar to those of the first embodiment. Arrangement and the numbers of the electromagnetic steel sheets 101 and the electromagnetic steel sheets 102 are not limited to the examples described above. In FIG. 12(B), two electromagnetic steel sheets 101 are disposed on each end of the rotor core 10D in the axial direction, but it is sufficient that two or more electromagnetic steel sheets 101 are disposed on at least one end of the rotor core 10D in the axial direction.

As described above, in the fifth embodiment, the rotor core 10D includes the electromagnetic steel sheets 101 (first electromagnetic steel sheets) and the electromagnetic steel sheets 102 (second electromagnetic steel sheets) as in the first embodiment, and thus demagnetization of the permanent magnets 2a, 2b, and 2c can be suppressed, strength of the rotor core 10D can be enhanced, and the insertion of the permanent magnets 2a, 2b, and 2c can be facilitated.

The electromagnetic steel sheets 101 and the electromagnetic steel sheets 102 are stacked in such a manner that the arrangement density of the electromagnetic steel sheets 101 increases toward each end of the rotor core 10C in the axial direction. Thus, the insertion of the permanent magnets 2a, 2b, and 2c can be further facilitated.

In addition, the electromagnetic steel sheets 101 and the electromagnetic steel sheets 102 are arranged symmetrically with respect to the center in the axial direction, and thus weight balance of the rotor core 10D in the axial direction can be enhanced.

Sixth Embodiment

Figure 13A:
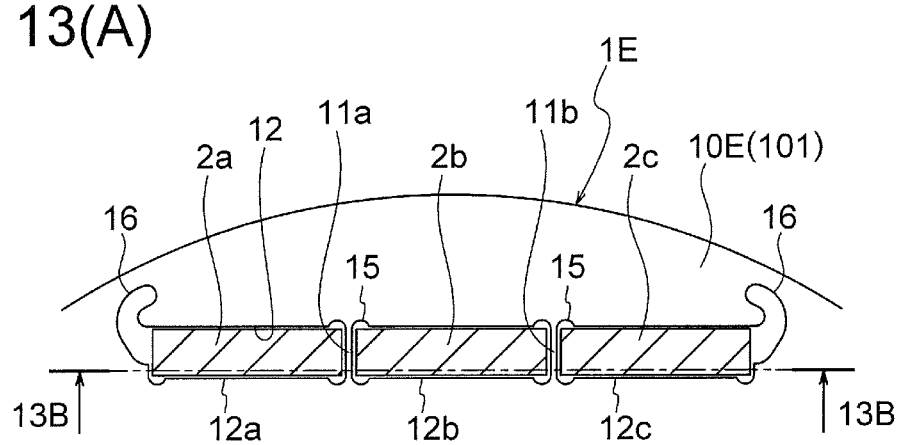
FIG. 13(A) is a sectional view of a rotor according to a sixth embodiment.
Figure 13B:
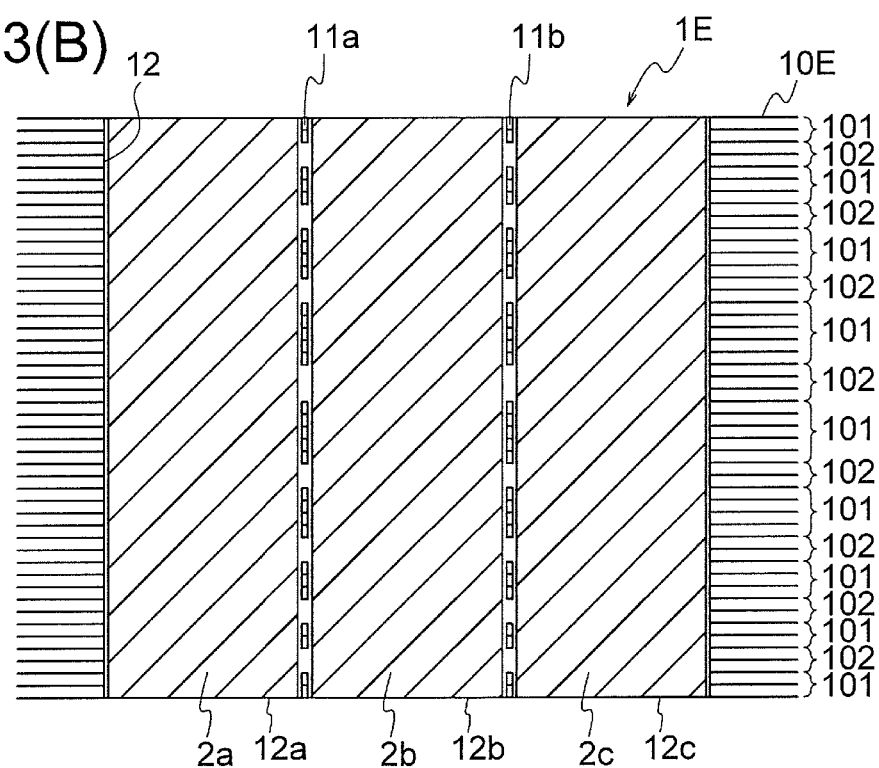
FIG. 13(B) is a sectional view taken along line 13B-13B.

Next, a sixth embodiment of the present invention will be described. FIG. 13(A) is a sectional view of a rotor 1E according to the sixth embodiment at a sheet surface of the electromagnetic steel sheet 101. FIG. 13(B) is a sectional view taken along line 13B-13B in FIG. 13(A) as seen in a direction indicated by arrows.

As illustrated in FIG. 13(B), the rotor core 10E includes two electromagnetic steel sheets 101, two electromagnetic steel sheets 102, three electromagnetic steel sheets 101, two electromagnetic steel sheets 102, four electromagnetic steel sheets 101, two electromagnetic steel sheets 102, five electromagnetic steel sheets 101, three electromagnetic steel sheets 102, five electromagnetic steel sheets 101, two electromagnetic steel sheets 102, four electromagnetic steel sheets 101, two electromagnetic steel sheets 102, three electromagnetic steel sheets 101, two electromagnetic steel sheets 102, two electromagnetic steel sheets 101, two electromagnetic steel sheets 102, and two electromagnetic steel sheets 101, from one end (top in the figure) to the other end (bottom in the figure) in the axial direction. The total number of the electromagnetic steel sheets 101 and 102 is 47.

That is, in the sixth embodiment, the electromagnetic steel sheets 101 (first electromagnetic steel sheets) are arranged at unequal intervals, and the electromagnetic steel sheets 102 (second electromagnetic steel sheets) are arranged at unequal intervals. In other words, the number of successively arranged sheets and arrangement intervals of the electromagnetic steel sheets 101 vary in the axial direction, and the number of successively arranged sheets and arrangement intervals of the electromagnetic steel sheets 102 vary in the axial direction.

In particular, the electromagnetic steel sheets 101 and the electromagnetic steel sheets 102 are stacked in such a manner that the arrangement density of the electromagnetic steel sheets 101 increases toward the center of the rotor core 10E in the axial direction (i.e., center of gravity of the rotor core 10E). The electromagnetic steel sheets 101 is heavier than the electromagnetic steel sheets 102 by a weight corresponding to the bridges 11a and 11b. Thus, by arranging the electromagnetic steel sheets 101 densely at the center in the axial direction, weight balance of the rotor core 10E in the axial direction can be enhanced.

In addition, the electromagnetic steel sheets 101 and the electromagnetic steel sheets 102 are stacked symmetrically with respect to the center in the axial direction (stacking direction). Accordingly, weight balance of the rotor core 10E in the axial direction can be further enhanced.

Other components of the sixth embodiment are similar to those of the first embodiment. Arrangement and the numbers of the electromagnetic steel sheets 101 and the electromagnetic steel sheets 102 are not limited to the examples described above. In FIG. 13(B), two electromagnetic steel sheets 101 are disposed on each end of the rotor core 10E in the axial direction, but it is sufficient that two or more electromagnetic steel sheets 101 are disposed on at least one end of the rotor core 10E in the axial direction.

As described above, in the sixth embodiment, since the rotor core 10E includes the electromagnetic steel sheets 101 (first electromagnetic steel sheets) and the electromagnetic steel sheets 102 (second electromagnetic steel sheets) as in the first embodiment, demagnetization of the permanent magnets 2a, 2b, and 2c can be suppressed, strength of the rotor core 10E can be enhanced, and the insertion of the permanent magnets 2a, 2b, and 2c can be facilitated.

The electromagnetic steel sheets 101 and the electromagnetic steel sheets 102 are stacked in such a manner that the arrangement density of the electromagnetic steel sheets 101 increases toward the center of the rotor core 10E in the axial direction. Thus, weight balance of the rotor core 10E in the axial direction can be enhanced.

In addition, the electromagnetic steel sheets 101 and the electromagnetic steel sheets 102 are arranged symmetrically with respect to the center in the axial direction, and thus weight balance of the rotor core 10E in the axial direction can be enhanced.

Seventh Embodiment

Figure 14A:
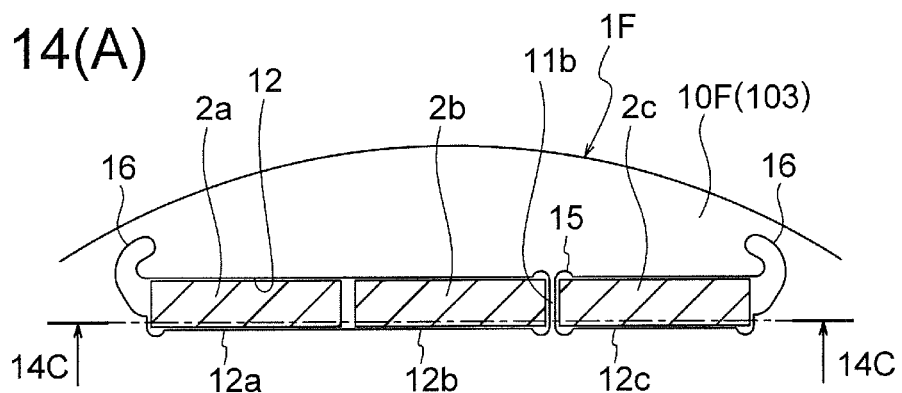
FIGS. 14(A) and 14(B) are sectional views of a rotor according to a seventh embodiment.
Figure 14B:
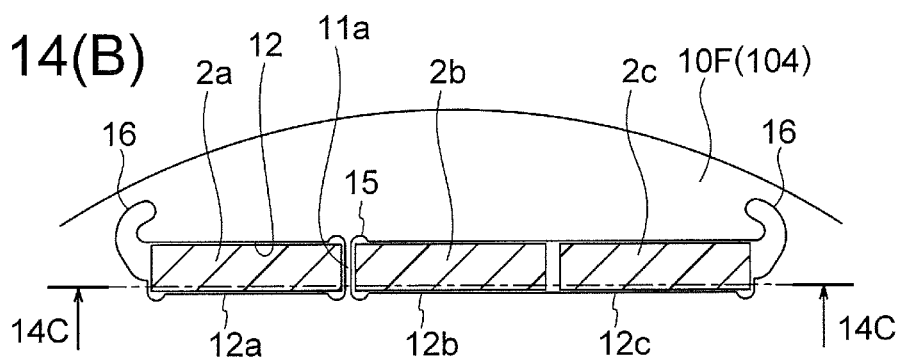
Figure 14C:
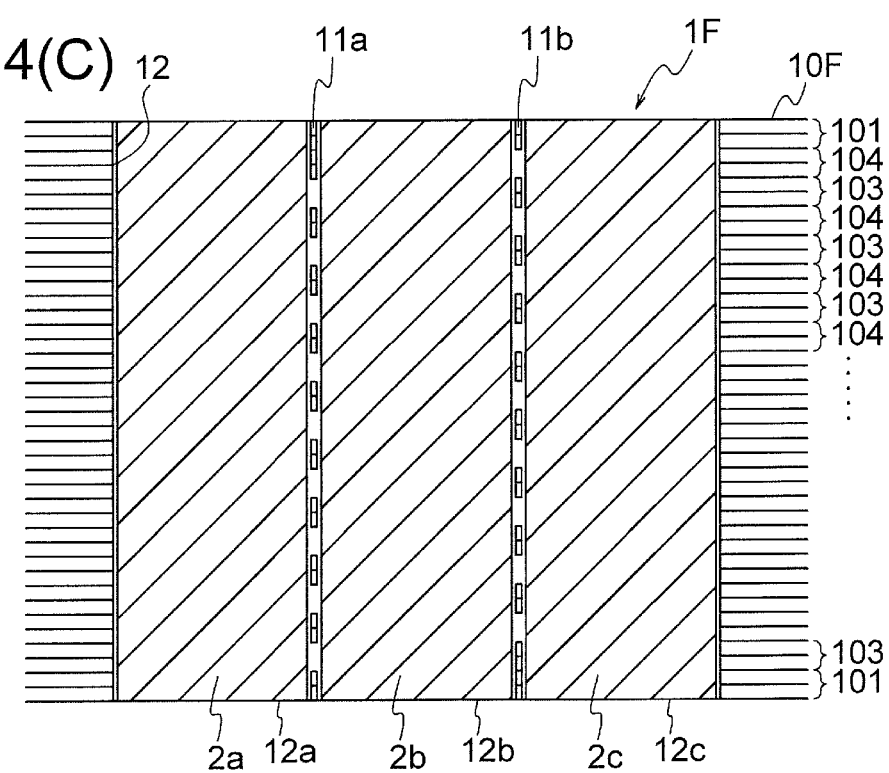
FIG. 14(C) is a sectional view taken along line 14C-14C.

Next, a seventh embodiment of the present invention will be described. A rotor core 10F according to the seventh embodiment includes electromagnetic steel sheets 103 and electromagnetic steel sheets 104 in addition to the electromagnetic steel sheets 101. FIG. 14(A) is a sectional view of a rotor 1F according to the seventh embodiment at a sheet surface of the electromagnetic steel sheet 103. FIG. 14(B) is a sectional view of the rotor 1F according to the seventh embodiment at a sheet surface of the electromagnetic steel sheet 104. FIG. 14(C) is a sectional view taken along line 14C-14C in FIGS. 14(A) and 14(B) as seen in a direction indicated by arrows.

As illustrated in FIG. 14(A), the magnet insertion hole 12 of the electromagnetic steel sheet 103 does not include the bridge 11a dividing the magnet insertion hole 12 into the first region 12a and the second region 12b, but includes the bridge 11b dividing the magnet insertion hole 12 into the second region 12b and the third region 12c. That is, the first region 12a and the second region 12b are continuous with each other, and the second region 12b and the third region 12c are divided by the bridge 11b. Other parts of the electromagnetic steel sheet 103 are similar to those of the electromagnetic steel sheet 101.

As illustrated in FIG. 14(B), the magnet insertion hole 12 of the electromagnetic steel sheet 104 includes the bridge 11a dividing the magnet insertion hole 12 into the first region 12a and the second region 12b, but does not include the bridge 11b dividing the magnet insertion hole 12 into the second region 12b and the third region 12c. That is, the first region 12a and the second region 12b are divided by the bridge 11a, and the second region 12b and the third region 12c are continuous with each other. Other parts of the electromagnetic steel sheet 104 are similar to those of the electromagnetic steel sheet 101.

In the electromagnetic steel sheet 103, the first region 12a and the second region 12b are not divided by the bridge, and thus the electromagnetic steel sheet 103 will be also referred to as a second electromagnetic steel sheet. In the electromagnetic steel sheet 104, the first region 12a and the second region 12b are divided by the bridge 11a, but the second region 12b and the third region 12c are not divided by the bridge. Thus, the electromagnetic steel sheet 104 will be also referred to as a third electromagnetic steel sheet.

As illustrated in FIG. 14(C), the rotor core 10F includes two electromagnetic steel sheets 101 at each end in the axial direction. In the rotor core 10F, nine combinations of two electromagnetic steel sheets 103 and two electromagnetic steel sheets 104 are stacked except for both ends of the rotor core 10F in the axial direction. In other words, the electromagnetic steel sheets 103 and the electromagnetic steel sheets 104 are alternately stacked two by two, and 36 electromagnetic steel sheets 103 and 104 are stacked in total. The total number of the electromagnetic steel sheets 101, 103, and 104 is 40.

That is, in the seventh embodiment, the electromagnetic steel sheets 103 are arranged at equal intervals in the axial direction, and the electromagnetic steel sheets 104 are arranged at equal intervals in the axial direction. That is, the electromagnetic steel sheets 103 are arranged so as to interpose a certain number (two) of electromagnetic steel sheets 104, and the electromagnetic steel sheets 104 are arranged so as to interpose a certain number (two) of electromagnetic steel sheets 103. Accordingly, weight balance of the rotor core 10F in the axial direction can be further enhanced.

Since the electromagnetic steel sheets 101 are disposed on both ends of the rotor core 10F in the axial direction, the insertion of the permanent magnets 2a, 2b, and 2c into the magnet insertion holes 12 is facilitated as in the first embodiment.

The electromagnetic steel sheet 103 does not include the bridge 11a and thus magnetic flux of diamagnetic field from the stator 5 is less likely to flow into the permanent magnets 2a and 2b, whereas the electromagnetic steel sheet 103 includes the bridge 11b and thus strength of the electromagnetic steel sheet 103 is higher than that of the electromagnetic steel sheet 102 (FIG. 4(B)) described in the first embodiment. The electromagnetic steel sheet 104 does not include the bridge 11b and thus magnetic flux of diamagnetic field is less likely to flow into the permanent magnets 2b and 2c, whereas the electromagnetic steel sheet 104 includes the bridge 11a and thus strength of the electromagnetic steel sheet 104 is higher than that of the electromagnetic steel sheet 102 (FIG. 4(B)). [0140]

Thus, with the configuration in which the rotor core 10F includes the electromagnetic steel sheets 103 and the electromagnetic steel sheets 104, strength of the rotor core 10F can be enhanced, and demagnetization of the permanent magnets 2a, 2b, and 2c can be suppressed.

Other components of the seventh embodiment are similar to those of the first embodiment. Arrangement and the numbers of the electromagnetic steel sheets 101, the electromagnetic steel sheets 103, and the electromagnetic steel sheets 104 are not limited to the examples described above. In FIG. 14(C), two electromagnetic steel sheets 101 are disposed on each end of the rotor core 10F in the axial direction, but it is sufficient that two or more electromagnetic steel sheets 101 are disposed on at least one end of the rotor core 10F in the axial direction.

As described above, in the seventh embodiment, the rotor core 10F includes the electromagnetic steel sheet 101 including the bridges 11a and 11b, the electromagnetic steel sheet 103 including only the bridge 11b, and the electromagnetic steel sheet 104 including only the bridge 11a. As a result, demagnetization of the permanent magnets 2a, 2b, and 2c can be suppressed, strength of the rotor core 10F can be enhanced, and the insertion of the permanent magnets 2a, 2b, and 2c can be facilitated.

Eighth Embodiment

Figure 15A:
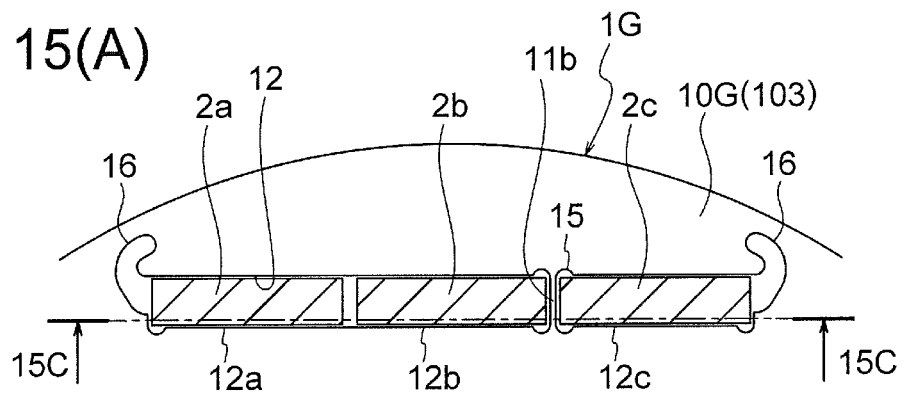
FIGS. 15(A) and 15(B) are sectional views of a rotor according to an eighth embodiment.
Figure 15B:
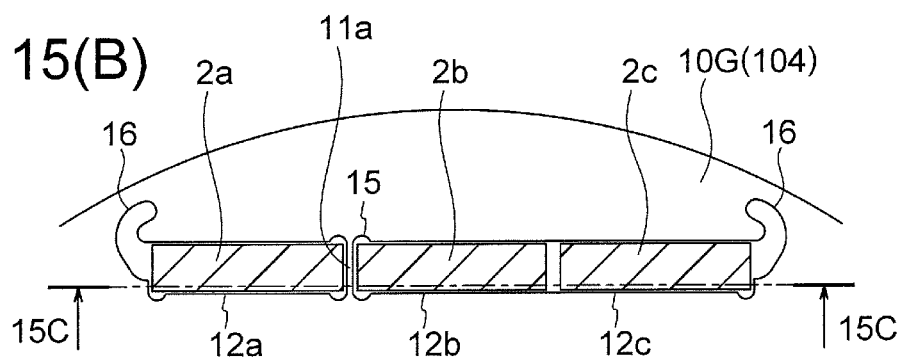
Figure 15C:
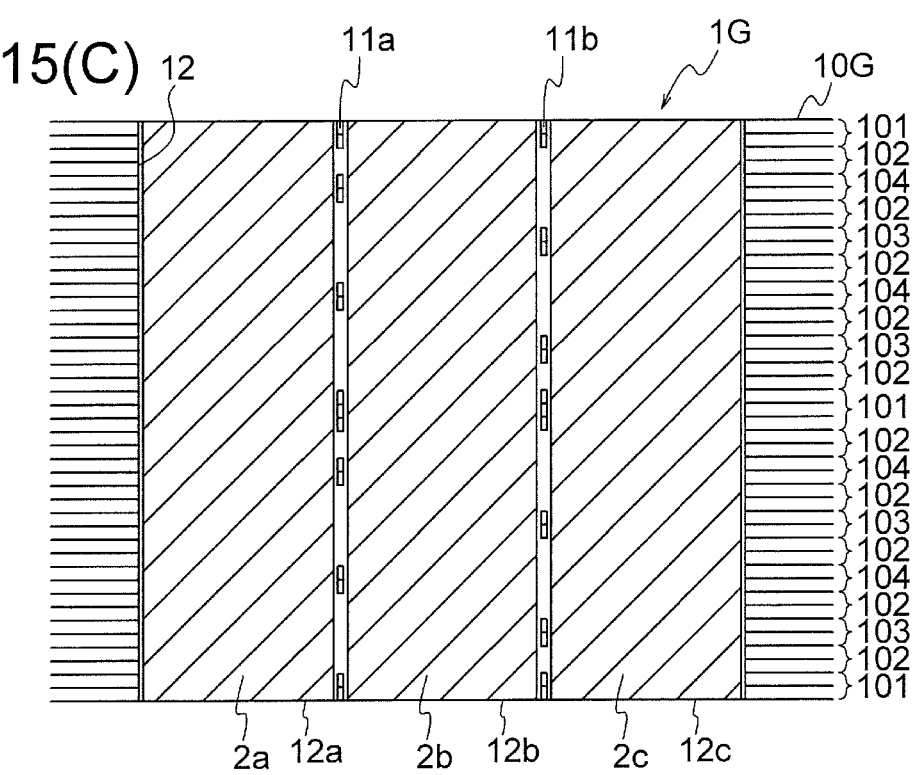
FIG. 15(C) is a sectional view taken along line 15C-15C.

Next, an eighth embodiment of the present invention will be described. A rotor core 10G according to the eighth embodiment includes the electromagnetic steel sheets 101, the electromagnetic steel sheets 102, the electromagnetic steel sheets 103, and the electromagnetic steel sheets 104. FIG. 15(A) is a sectional view of a rotor 1G according to the eighth embodiment at a sheet surface of the electromagnetic steel sheet 103. FIG. 15(B) is a sectional view of the rotor 1G at a sheet surface of the electromagnetic steel sheet 104. FIG. 15(C) is a sectional view taken along line 15C-15C in FIGS. 15(A) and 15(B) as seen in a direction indicated by arrows.

As illustrated in FIG. 15(C), the rotor core 10G includes two electromagnetic steel sheets 101 at each end in the axial direction, and also includes two electromagnetic steel sheets 101 at the center in the axial direction.

Between the two electromagnetic steel sheets 101 at one end (top in the figure) of the rotor core 10G in the axial direction and the two electromagnetic steel sheets 101 at the center of the rotor core 10G in the axial direction, two electromagnetic steel sheets 102, two electromagnetic steel sheets 104, two electromagnetic steel sheets 102, two electromagnetic steel sheets 103, two electromagnetic steel sheets 102, two electromagnetic steel sheets 104, two electromagnetic steel sheets 102, two electromagnetic steel sheets 103, and two electromagnetic steel sheets 102 are arranged.

Between the two electromagnetic steel sheets 101 at the center of the rotor core 10G in the axial direction and the two electromagnetic steel sheets 101 at the other end (bottom in the figure) of the rotor core 10G in the axial direction, two electromagnetic steel sheets 102, two electromagnetic steel sheets 104, two electromagnetic steel sheets 102, two electromagnetic steel sheets 103, two electromagnetic steel sheets 102, two electromagnetic steel sheets 104, two electromagnetic steel sheets 102, two electromagnetic steel sheets 103, and two electromagnetic steel sheets 102 are arranged.

That is, two electromagnetic steel sheets 102 are disposed between two electromagnetic steel sheets 101 and two electromagnetic steel sheets 104 adjacent to each other in the axial direction, and two electromagnetic steel sheets 102 are disposed between two electromagnetic steel sheets 101 and two electromagnetic steel sheets 103 adjacent to each other in the axial direction.

The rotor core 10G includes the electromagnetic steel sheet 101 including the bridges 11a and 11b, the electromagnetic steel sheet 102 which does not include the bridges 11a and 11b, the electromagnetic steel sheet 103 including only the bridge 11b, and the electromagnetic steel sheet 104 including only the bridge 11a. Accordingly, strength of the rotor core 10G can be enhanced, and demagnetization of the permanent magnets 2a, 2b, and 2c can be suppressed. In addition, the electromagnetic steel sheets 102 are disposed between the electromagnetic steel sheets 101, 103, and 104 in the axial direction, and thus the effect of suppressing demagnetization of the permanent magnets 2a, 2b, and 2c can be enhanced.

Since the electromagnetic steel sheets 101 are disposed on both ends of the rotor core 10G in the axial direction, the insertion of the permanent magnets 2a, 2b, and 2c into the magnet insertion holes 12 is facilitated as in the first embodiment. Since the electromagnetic steel sheets 101 are disposed at the center of the rotor core 10G in the axial direction, the permanent magnets 2a, 2b, and 2c can be securely positioned in the magnet insertion holes 12.

As described in the seventh embodiment, the electromagnetic steel sheet 103 will be also referred to as the second electromagnetic steel sheet, and the electromagnetic steel sheet 104 will be also referred to as the third electromagnetic steel sheet. Regarding the configuration of the eighth embodiment, the electromagnetic steel sheet 102 will be also referred to as a fourth electromagnetic steel sheet.

Other components of the eighth embodiment are similar to those of the first embodiment. Arrangement and the numbers of the electromagnetic steel sheets 101, the electromagnetic steel sheets 102, the electromagnetic steel sheets 103, and the electromagnetic steel sheets 104 are not limited to the examples described above. In FIG. 15(C), two electromagnetic steel sheets 101 are disposed on each end of the rotor core 10G in the axial direction, but it is sufficient that two or more electromagnetic steel sheets 101 are disposed on at least one end of the rotor core 10G in the axial direction.

As described above, in the eighth embodiment, the rotor core 10G includes the electromagnetic steel sheet 101 including the bridges 11a and 11b, the electromagnetic steel sheet 102 which does not include the bridges 11a and 11b, the electromagnetic steel sheet 103 including only the bridge 11b, and the electromagnetic steel sheet 104 including only the bridge 11a. Thus, demagnetization of the permanent magnets 2a, 2b, and 2c can be more effectively suppressed, and strength of the rotor core 10G can be enhanced.

Ninth Embodiment

Next, a ninth embodiment of the present invention will be described. In the first through eighth embodiments described above, each of the magnet insertion holes 12 of the rotor core 10 is divided into the three regions 12a, 12b, and 12c by the bridges 11a and 11b. In contrast, in the ninth embodiment, each of the magnet insertion holes 12 is divided into two regions 12a and 12b by the bridge 11a. A rotor core 10H according to the ninth embodiment is constituted by electromagnetic steel sheets 105 (first electromagnetic steel sheets) and electromagnetic steel sheets 106 (second electromagnetic steel sheets).

FIG. 16(A) is a sectional view of a rotor 1H according to the ninth embodiment at a sheet surface of the electromagnetic steel sheets 105. FIG. 16(B) is a sectional view of the rotor 1H at a sheet surface of the electromagnetic steel sheet 106. FIG. 16(C) is a sectional view taken along line 16C-16C in FIGS. 16(A) and 16(B) as seen in a direction indicated by arrows.

As illustrated in FIG. 16(A), each of the electromagnetic steel sheets 105 of the rotor core 10H includes the bridge 11a at a center of the magnet insertion hole 12 in the circumferential direction. The bridge 11a connects the inner side and the outer side of the magnet insertion hole 12 in the radial direction, and divides the magnet insertion hole 12 into the first region 12a and the second region 12b in the circumferential direction. Permanent magnets 2a and 2b are inserted in the first region 12a and the second region 12b, respectively.

In the magnet insertion hole 12, opening 15 are formed at a portion on an outer edge of the first region 12a in the radial direction adjacent to the bridge 11a and a portion on an inner edge of the first region 12a in the radial direction adjacent to the bridge 11a. Openings 15 are also formed at a part of an outer edge of the second region 12b in the radial direction adjacent to the bridge 11a and a portion on an inner edge of the second region 12b in the radial direction adjacent to the bridge 11a.

In addition, openings 15 are also formed at a portion on the inner edge of the first region 12a in the radial direction adjacent to the positioning part 17a and a portion on the inner edge of the second region 12b in the radial direction adjacent to the positioning part 17b. Other components of the configuration of the electromagnetic steel sheets 105 are similar to those of the electromagnetic steel sheets 101 described in the first embodiment.

As illustrated in FIG. 16(C), the electromagnetic steel sheet 106 of the rotor core 10H does not include the bridge 11a dividing the magnet insertion hole 12. That is, the electromagnetic steel sheet 106 has a structure similar to that of the electromagnetic steel sheet 102 described in the first embodiment.

The electromagnetic steel sheets 105 and the electromagnetic steel sheets 106 are stacked in a manner similar to the stacked structure of the electromagnetic steel sheets 101 and the electromagnetic steel sheets 102 in the first embodiment (FIG. 5(B)). The electromagnetic steel sheets 105 and the electromagnetic steel sheets 106 may also be stacked as described in the second through eighth embodiments.

Other components of the ninth embodiment are similar to those of the first embodiment. In FIG. 16(C), two electromagnetic steel sheets 105 are disposed on each end of the rotor core 10H in the axial direction, but it is sufficient that two or more electromagnetic steel sheets 105 are disposed on at least one end of the rotor core 10H in the axial direction.

In the ninth embodiment, the rotor core 10H includes the electromagnetic steel sheet 105 and the electromagnetic steel sheet 106, and thus demagnetization of the permanent magnets 2a and 2b can be suppressed, and strength of the rotor core 10H can be obtained. In addition, since the rotor core 10H includes two or more electromagnetic steel sheets 101 on at least one end in the axial direction, the insertion of the permanent magnets 2a and 2b is facilitated.

As described above, in the ninth embodiment, demagnetization of the permanent magnets 2a and 2b can be suppressed, strength of the rotor core 10H can also be enhanced, and the insertion of the permanent magnets 2a and 2b can be facilitated, in the rotor core 10H in which each of the magnet insertion holes 12 is divided into two regions 12a and 12b by the bridge 11a.

In the first through ninth embodiments described above, each of the magnet insertion holes 12 of the rotor core 10 is divided into two or three regions by the bridges 11a and 11b (or the bridge 11a). Alternatively, each of the magnet insertion holes 12 may be divided into four or more.

(Compressor)

Figure 17:
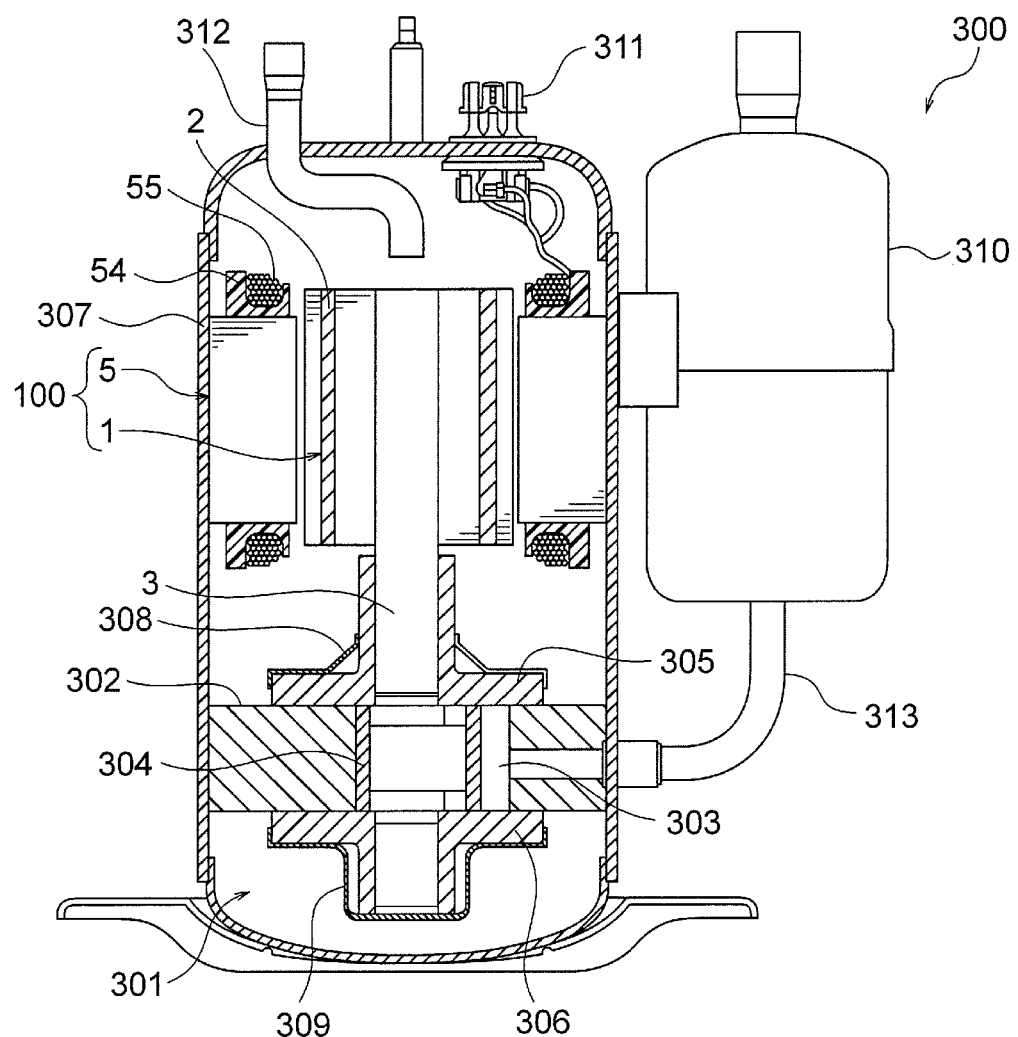
FIG. 17 is a longitudinal sectional view of a compressor to which the motor of each of the embodiments is applicable.

Next, a compressor 300 to which the motor 100 described in the first through ninth embodiments is applicable will be described. FIG. 17 is a sectional view illustrating a configuration of the compressor 300. The compressor 300 is configured as a rotary compressor, and is used for, for example, an air conditioner. The compressor 300 includes a closed container 307, a compression mechanism 301 disposed in the closed container 307, and the motor 100 that drives the compression mechanism 301.

The compression mechanism 301 includes a cylinder 302 having a cylinder chamber 303, a shaft 3 that is rotated by the motor 100, a rolling piston 304 fixed to the shaft 3, a vane (not shown) partitioning an inside of the cylinder chamber 303 into an suction side and a compression side, and an upper frame 305 and a lower frame 306 through which the shaft 3 is inserted. The upper frame 305 and the lower frame 306 close end surfaces of the cylinder chamber 303 in the axial direction. An upper discharge muffler 308 and a lower discharge muffler 309 are mounted to the upper frame 305 and the lower frame 306, respectively.

The closed container 307 is a cylindrical container. Refrigerating machine oil (now shown) for lubricating sliding parts of the compression mechanism 301 is stored in a bottom part of the closed container 307. The shaft 3 is rotatably held by the upper frame 305 and the lower frame 306 serving as bearings.

The cylinder 302 includes the cylinder chamber 303 therein, and the rolling piston 304 eccentrically rotates in the cylinder chamber 303. The shaft 3 includes an eccentric shaft part, and the rolling piston 304 is fitted to the eccentric shaft part.

The stator 5 of the motor 100 is fitted inside the frame of the closed container 307 by shrink fitting or the like. The coil 55 of the stator 5 is supplied with electric power from a glass terminal 311 fixed to the closed container 307. The shaft 3 is fixed to a shaft hole 19 formed at the center of the rotor core 10 (FIG. 2) of the rotor 1.

An accumulator 310 for storing refrigerant gas is attached to an outer side of the closed container 307. A suction pipe 313 is fixed to the closed container 307, and refrigerant gas is supplied from the accumulator 310 to the cylinder 302 through the suction pipe 313. A discharge pipe 312 for discharging refrigerant to the outside is provided on an upper part of the closed container 307.

Refrigerant gas supplied from the accumulator 310 passes through the suction pipe 313 and is supplied into the cylinder chamber 303 of the cylinder 302. When the motor 100 is driven and the rotor 1 rotates, the shaft 3 rotates together with the rotor 1. Then, the rolling piston 304 fitted to the shaft 3 eccentrically rotates in the cylinder chamber 303, and refrigerant is compressed in the cylinder chamber 303. The refrigerant compressed in the cylinder chamber 303 passes through the discharge mufflers 308 and 309, passes through air holes (not shown) and rises in the closed container 307, and is discharged from the discharge pipe 312.

In the motor 100 described in the first through ninth embodiments, demagnetization of the permanent magnets is less likely to occur, and high output can be obtained. Thus, operation efficiency of the compressor 300 can be enhanced.

(Air Conditioner)

Figure 18:
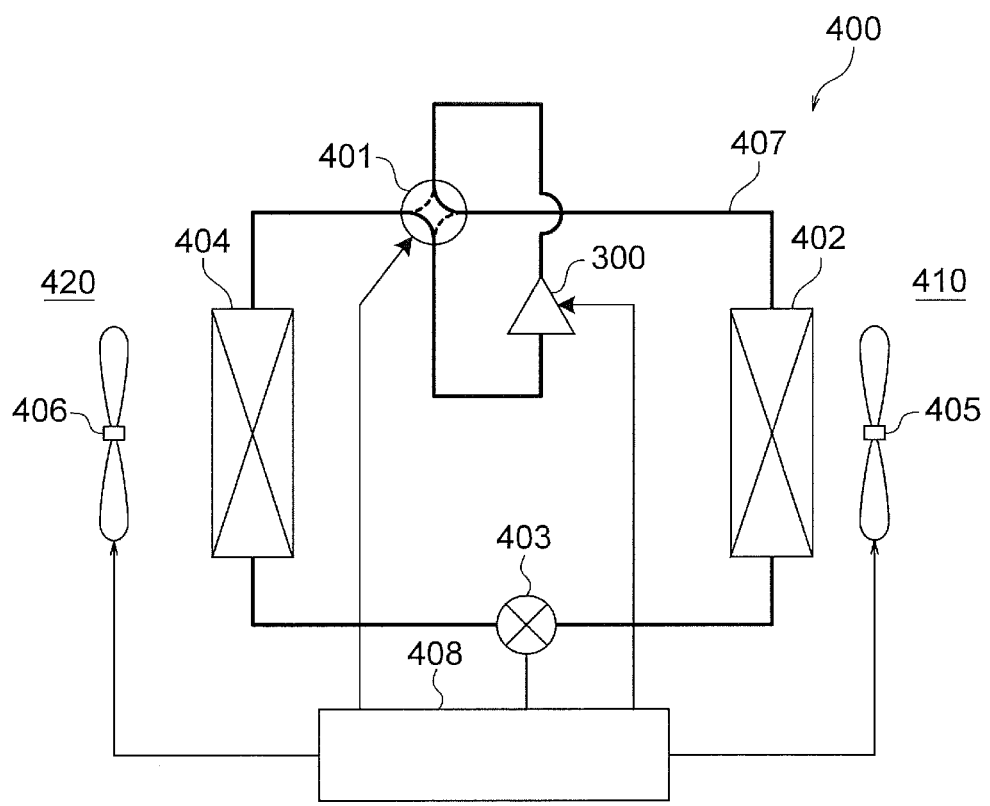
FIG. 18 is a diagram illustrating an air conditioner (refrigeration cycle apparatus) including the compressor illustrated in FIG. 17.

Next, an air conditioner 400 (refrigeration cycle apparatus) including the compressor 300 illustrated in FIG. 17 will be described. FIG. 18 is a diagram illustrating a configuration of the air conditioner 400. The air conditioner 400 illustrated in FIG. 18 includes a compressor 401, a condenser 402, a throttling device (expansion valve) 403, and an evaporator 404. The compressor 401, the condenser 402, the throttling device 403, and the evaporator 404 are connected to each other by a refrigerant pipe 407 and constitute a refrigeration cycle. That is, refrigerant circulates through the compressor 401, the condenser 402, the throttling device 403, and the evaporator 404 in this order.

The compressor 401, the condenser 402, and the throttling device 403 are provided in an outdoor unit 410. The compressor 401 is constituted by the compressor 300 illustrated in FIG. 17. The outdoor unit 410 is provided with an outdoor fan 405 for supplying outdoor air to the condenser 402. The evaporator 404 is provided in an indoor unit 420. The indoor unit 420 is provided with an indoor fan 406 for supplying indoor air to the evaporator 404.

An operation of the air conditioner 400 is as follows. The compressor 401 compresses sucked refrigerant and sends the compressed refrigerant. The condenser 402 performs heat exchange between the refrigerant flowing from the compressor 401 and outdoor air, condenses the refrigerant to liquefy the refrigerant, and sends the refrigerant to the refrigerant pipe 407. The outdoor fan 405 supplies outdoor air to the condenser 402. The throttling device 403 changes its opening degree to thereby adjust the pressure or the like of refrigerant flowing in the refrigerant pipe 407.

The evaporator 404 performs heat exchange between indoor air and the refrigerant changed to a low-pressure state by the throttling device 403, causes the refrigerant to absorb heat from the air to evaporate (vaporize), and sends the refrigerant to the refrigerant pipe 407. The indoor fan 406 supplies indoor air to the evaporator 404. Accordingly, cold air deprived of heat by the evaporator 404 is supplied to the room.

The compressor 401 (compressor 300 in FIG. 17) includes the motor 100 described in the first through ninth embodiments, and has therefore high operation efficiency. Thus, operation efficiency of the air conditioner 400 can be enhanced.

Although the preferred embodiments of the present invention have been specifically described above, the present invention is not limited to the above-described embodiments, and various modifications or variations may be made without departing from the gist of the invention.

The motors 100 described in the first through ninth embodiments are not limited to application to the compressor 300 described with reference to FIG. 8, and may be applied to other types of compressors. Air conditioners using the motors 100 are not limited to the air conditioner 400 described with reference to FIG. 18.

What is claimed is:

1. A rotor comprising:
   a rotor core formed of a stacked body in which two or more first electromagnetic steel sheets and a second electromagnetic steel sheet are stacked in a direction of an axis, the rotor core having a magnet insertion hole passing through the stacked body in the direction of the axis; and
   a first permanent magnet and a second permanent magnet disposed in the magnet insertion hole,
   wherein the magnet insertion hole has a first region in which the first permanent magnet is inserted, and a second region in which the second permanent magnet is inserted, the first region and the second region being arranged in a circumferential direction with respect to the axis,
   wherein the two or more first electromagnetic steel sheets are disposed on at least one end of the rotor core in the direction of the axis,
   wherein each of the two or more first electromagnetic steel sheets has a bridge dividing the magnet insertion hole into the first region and the second region, and
   wherein the second electromagnetic steel sheet has the magnet insertion hole in which the first region and the second region are formed continuously with each other in the circumferential direction and in which the first permanent magnet and the second permanent magnet face each other.

2. The rotor according to claim 1, wherein the two or more first electromagnetic steel sheets are disposed on each end of the rotor core in the direction of the axis.

3. The rotor according to claim 1, wherein a length of the bridge in the circumferential direction is greater than or equal to a thickness of each of the two or more first electromagnetic steel sheets, and is less than or equal to 1.5 times the thickness.

4. The rotor according to claim 1, wherein each of the two or more first electromagnetic steel sheets has an opening on each side of the magnet insertion hole in a radial direction with respect to the axis, the opening being adjacent to the bridge.

5. A motor comprising:
   a stator; and a rotor according to claim 1 disposed on an inner side of the stator.

6. A compressor comprising:
a motor; and
a compression mechanism that is driven by the motor, the motor comprising:
a stator, and
a rotor according to claim 1 disposed on an inner side of the stator.

7. An air conditioner comprising a compressor, a condenser, a decompression device, and an evaporator,
the compressor comprising a motor and a compression mechanism that is driven by the motor,
the motor comprising:
a stator, and
a rotor according to claim 1 disposed on an inner side of the stator.

8. The rotor according to claim 1, wherein the rotor core has:
a first number of first electromagnetic steel sheets including the two or more first electromagnetic steel sheets, and
a second number of second electromagnetic steel sheets including the second electromagnetic steel sheet.

9. The rotor according to claim 8, wherein the first number of first electromagnetic steel sheets are arranged at equal intervals in the direction of the axis, and the second number of second electromagnetic steel sheets are arranged at equal intervals in the direction of the axis.

10. The rotor according to claim 8, wherein the first number of first electromagnetic steel sheets are arranged at unequal intervals in the direction of the axis, and the second number of second electromagnetic steel sheets are arranged at unequal intervals in the direction of the axis.

11. The rotor according to claim 8, wherein the first number of first electromagnetic steel sheets and the second number of second electromagnetic steel sheets are arranged in a symmetrical manner with respect to a center of the rotor core in the direction of the axis.

12. The rotor according to claim 8, wherein the first number of first electromagnetic steel sheets and the second number of second electromagnetic steel sheets are arranged so that an arrangement density of the first number of first electromagnetic steel sheets increases toward at least one end of the rotor core in the direction of the axis.

13. The rotor according to claim 8, wherein the second number of second electromagnetic steel sheets has a third number of second electromagnetic steel sheets arranged continuously in the direction of the axis, the third number being larger than or equal to a number of poles.

14. The rotor according to claim 13, wherein each of the third number of second electromagnetic steel sheets has the magnet insertion hole in which the first region and the second region are formed continuously with each other and the magnet insertion hole in which the first region and the second region are divided by the bridge.

15. The rotor according to claim 8, wherein the first number of first electromagnetic steel sheets and the second number of second electromagnetic steel sheets are arranged so that an arrangement density of the first number of first electromagnetic steel sheets increases toward a center of the rotor core in the direction of the axis.

16. The rotor according to claim 1, wherein the magnet insertion hole of the rotor core further has a third region in which a third permanent magnet is disposed, and,
wherein each of the two or more first electromagnetic steel sheets has another bridge diving the magnet insertion hole into the second region and the third region.

17. The rotor according to claim 16, wherein the second electromagnetic steel sheet is configured so that the first region and the second region are continuously formed, and has a bridge diving the magnet insertion hole into the second region and the third region.

18. The rotor according to claim 17, wherein the rotor core has a third electromagnetic steel sheet, and
wherein the third electromagnetic steel sheet has a bridge diving the magnet insertion hole into the first region and the second region, and the second region and the third region of the magnet insertion hole are continuously formed.

19. The rotor according to claim 18, wherein the rotor core has a fourth electromagnetic steel sheet, and
wherein the fourth electromagnetic steel sheet is configured so that the first region and the second region of the magnet insertion hole are continuously formed, and the second region and the third region are continuously formed.

* * * * *